(12) United States Patent
Yamaguchi

(10) Patent No.: US 8,462,905 B2  
(45) Date of Patent: Jun. 11, 2013

(54) RECEIVER CIRCUIT

(75) Inventor: Hisakatsu Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/364,865

(22) Filed: Feb. 2, 2012

(65) Prior Publication Data

US 2012/0177098 A1    Jul. 12, 2012

Related U.S. Application Data

(60) Division of application No. 12/561,917, filed on Sep. 17, 2009, which is a continuation of application No. PCT/JP2007/000259, filed on Mar. 19, 2007.

(51) Int. Cl.  
*H04B 1/10* (2006.01)

(52) U.S. Cl.  
USPC ............ 375/350; 375/233; 375/355; 375/232

(58) Field of Classification Search  
USPC ......................................... 375/232  
See application file for complete search history.

(56) References Cited

U.S. PATENT DOCUMENTS 5,948,083 A    9/1999 Gervasi  
2007/0195874 A1*  8/2007 Aziz et al. .................... 375/233

FOREIGN PATENT DOCUMENTS

JP    2005-303607 A    10/2005

OTHER PUBLICATIONS

Jan W.M. Bergmans: "Digital Baseband Transmission and Recording", Kluwer Academic Publishers, pp. 373-450.

* cited by examiner

*Primary Examiner* — Lihong Yu  
(74) *Attorney, Agent, or Firm* — Arent Fox LLP

(57) ABSTRACT

A first phase adjustment circuit adjusts phases of a data decision clock signal and a first boundary decision clock signal according to a phase adjustment amount based on an output signal of a data decision circuit and an output signal of a first boundary decision circuit. A second phase adjustment circuit adjusts a phase of a second boundary decision clock signal according to a result of adding the phase adjustment amount and a phase adjustment amount offset. An adaptive equalization control circuit adjusts an equalization coefficient of an equalization circuit according to a data width of an output signal of the equalization circuit based on a logical comparison result between the output signal of the data decision circuit and an output signal of a second boundary decision circuit when the phase adjustment amount offset is changed.

8 Claims, 14 Drawing Sheets

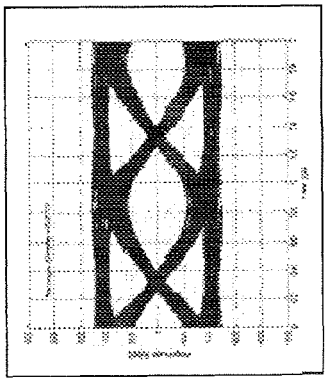
FIG. 2D (EQ_COEFF=0x3)
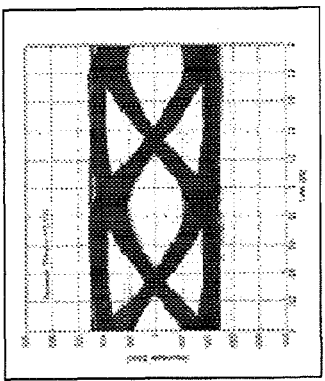
FIG. 2C (EQ_COEFF=0x2)
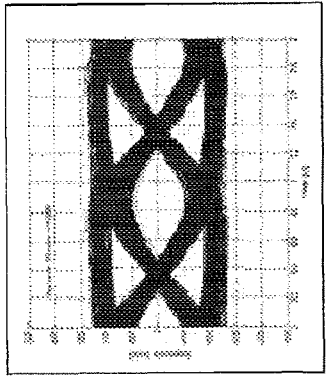
FIG. 2B (EQ_COEFF=0x1)
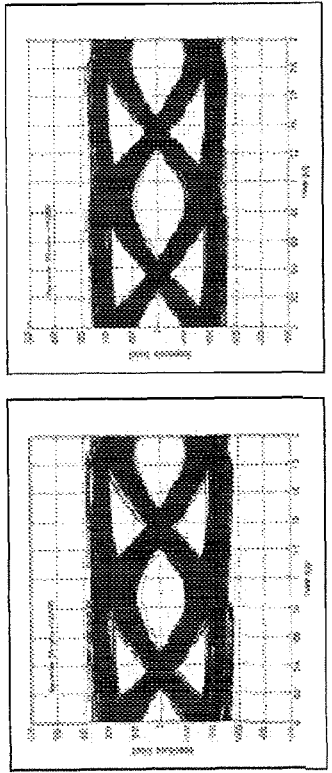
FIG. 2A (EQ_COEFF=0x0)
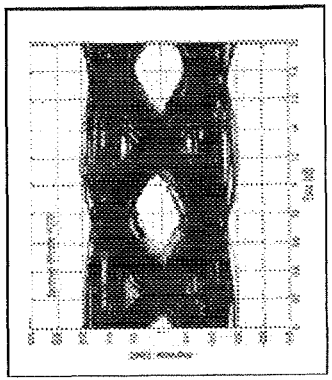
FIG. 2H (EQ_COEFF=0x7)
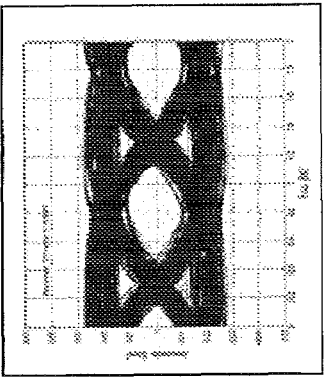
FIG. 2G (EQ_COEFF=0x6)
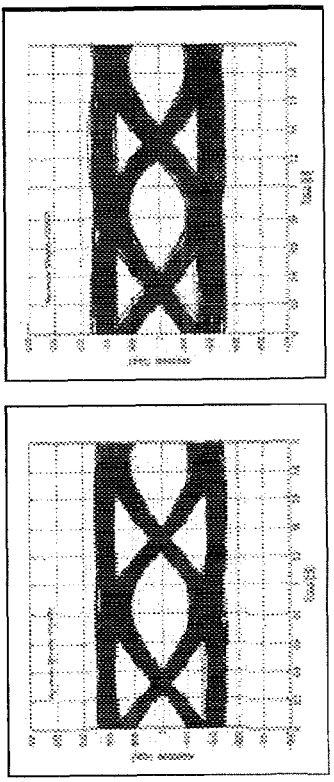
FIG. 2F (EQ_COEFF=0x5)
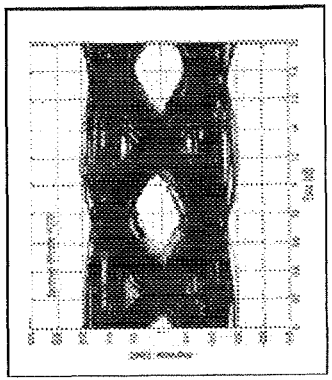
FIG. 2E (EQ_COEFF=0x4)

RECEIVER CIRCUIT

CROSS-REFERENCE TO RELATED APPLICATION

This Application is a Divisional Application of U.S. patent application Ser. No. 12/561,917, having a filing date of Sep. 17, 2009, which is a Continuation Application of International Application No. PCT/JP2007/000259, having an international filing date of Mar. 19, 2007; the disclosure of each of which is hereby incorporated in its entirety by reference.

FIELD

The embodiment discussed herein is related to an adaptive equalization method of a receiver circuit used for data communication.

BACKGROUND

In general, when data communication is performed via a transmission line or the like having a large transmission loss, an equalization circuit is used on the receiver side so as to compensate the transmission loss. FIGS. 11A and 11B illustrate an example of an equalization circuit. The equalization circuit EQ illustrated in FIG. 11A includes transistors T1 to T8, resistance elements R1 to R4 and a capacitance element C1. The transistors T1, T2 (T3, T4) are coupled in series between an output terminal OUT (OUTX) and a ground line. A control terminal of the transistor T1 (T3) is coupled to an input terminal INX (IN). Control terminals of the transistors T2, T4 are coupled to a bias terminal BIAS. The resistance element R1 and the capacitance element C1 are coupled in parallel between a connection node of the transistors T1, T2 and a connection node of the transistors T3, T4. The resistance element 121 is a variable resistance element in which a resistance value changes corresponding to an equalization coefficient value of the equalization circuit EQ.

The transistors T5, T6 (T7, T8) are coupled in series between a connection node of the transistor T1 (T3) and the output terminal OUT (OUTX) and a ground line. A control terminal of the transistor T5 (T7) is coupled to the connection node of the transistor T1 (T3) and the output terminal OUT (OUTX). Control terminals of the transistors T6, T8 are coupled to the bias terminal BIAS. The resistance R2 is coupled between a connection node of the transistors T5, T6 and a connection node of the transistors T7, T8. The resistance R3 (R4) is coupled between the connection node of the transistor T1 (T3) and the output terminal OUT (OUTX) and a power supply line.

The equalization circuit EQ having such a structure allows adjusting the resistance value of the resistance element R1 via the equalization coefficient value so as to change a gain-frequency characteristic. For example, when the equalization coefficient value of the equalization circuit EQ is changed in eight steps (c0=0×0, c1=0×1, . . . , c7=0×7), the gain-frequency characteristic of the equalization circuit EQ changes as illustrated in FIG. 11B. As can be understood from FIG. 11B, the equalization circuit has a function to amplify a high frequency component of an input signal. In a receiver circuit receiving an output signal of a transmitter circuit via a transmission line, an input signal in the receiver circuit has an attenuated high frequency component, and thus the equalization circuit is used for compensating the attenuated high frequency component. The waveform (eye pattern) of an input signal of the receiver circuit changes due to temperature changes and changes over time of the transmission line, and thus it may be necessary to adjust the equalization coefficient value of the equalization circuit in accordance with characteristics of the transmission line, so as to assure an amplitude that is adequate for allowing decision with respect to an input signal of a data decision circuit provided in a latter stage of the equalization circuit. A technique to realize the operations described above is adaptive equalization.

FIG. 12 illustrates the concept of adaptive equalization. When the waveform of an input signal in a receiver circuit 520 changes accompanying a temperature change in a transmission line 500 provided between a transmitter circuit 510 and the receiver circuit 520, for example when a loss of the transmission line 500 becomes large and the amplitude of an input signal in the receiver circuit 520 becomes small, the equalization coefficient value of an equalization circuit 521 is adjusted by the adaptive equalization, so as to assure an amplitude that is adequate for allowing decision with respect to an input signal of a data decision circuit 522. Thus, the adaptive equalization is a technique to detect the influence of temperature changes and changes over time of a transmission One or the like on an input signal of a receiver circuit, and adjust the equalization coefficient value of an equalization circuit according to the degree of the influence. When data communication is performed via a transmission line having a large transmission loss or the like, for example when data communication is performed via a cheaper transmission line, the adaptive equalization is an indispensable technique.

FIG. 13 illustrates an example of a receiver circuit. A receiver circuit 12 receiving an output signal of a transmitter circuit 11 via a transmission line 10 includes an equalization circuit 13, a data decision circuit 14, a demultiplexer (DEMUX) 15, an analog-to-digital converter (ADC) 16, and an adaptive equalization control circuit 17. The adaptive equalization control circuit 17 includes a selector (SEL) 18, an amplifier (AMP) 19, a subtractor 20, a step size parameter circuit (SSP) 21, and an integrator 22. Note that the receiver circuit illustrated in FIG. 13 is equivalent to one disclosed in Non-patent Document 1, and thus detailed descriptions of respective circuits will be omitted.

In the receiver circuit of the type illustrated in FIG. 13, the adaptive equalization control circuit employs a method to adjust the equalization coefficient value of the equalization circuit based on an algorithm using a least squares method. In the method described above, the difference between an output amplitude y of the equalization circuit and an expected amplitude d is obtained as an amplitude error e, and feedback control with respect to the equalization circuit is performed so that the mean square value of the amplitude error e becomes small. Further, when making an LSI of the adaptive equalization control circuit, generally the adaptive equalization control circuit is realized in a digital area having high affinity with LSIs. Therefore, in the receiver circuit 12, there is provided an analog-to-digital converter 16 converting an output amplitude of the equalization circuit 13 into a digital value. Further, when obtaining an expected value for the output value of the analog-to-digital converter 16, it is just needed to multiply the output logical value ("+1" or "−1") of the data decision circuit 14 by an expected amplitude. However, there exists an input-output latency in the analog-to-digital converter 16, and thus it may be necessary to obtain the logical value corresponding to output data of the analog-to-digital converter 16 from output data of the demultiplexer 15. Accordingly, in the adaptive equalization control circuit 17, the one bit data corresponding to the output data of the analog-to-digital converter 16 is selected by the selector 18 from plural bit data output from the demultiplexer 15. However, when making the LSI of the adaptive equalization control circuit, the timing adjustment described above leads to increases in circuit scale and power consumption.

FIG. 14 illustrates another example of a receiver circuit. The receiver circuit illustrated in FIG. 14 includes an equalization circuit (EQ) 30, a data decision circuit 32, a boundary decision circuit 33, a demultiplexer (DEMUX) 34, a clock recovery unit (CRU) 36, an equalization parameter control unit (EQ parameter control unit) 38, a clock generation circuit (PI) 40, and an inter-symbol interference monitor unit (ISI monitor unit) 52. Note that the receiver circuit illustrated in FIG. 14 is equivalent to one disclosed in Patent Document 1, and thus detailed descriptions of respective circuits will be omitted.

In the receiver circuit illustrated in FIG. 14, the inter-symbol interference monitor unit 52 and the equalization parameter control unit 38 play the main role of the adaptive equalization function. When deriving an optimal value of an equalization parameter EQPR of the equalization circuit 30, an output signal Dn of the data decision circuit 32 and an output signal Dn(b) of the boundary decision circuit 33 are used. In the clock generation circuit 40, the phase of a clock signal DBT that defines a decision timing in the boundary decision circuit 33 changes dynamically according to a delay amount control code DELAY supplied from the equalization parameter control unit 38. In the inter-symbol interference monitor unit 52, a phase fluctuation amount of an output signal An of the equalization circuit 30 is detected based on the logical comparison result between the output signal Dn of the data decision circuit 32 and the output signal Dn(b) of the boundary decision circuit 33. In the equalization parameter control unit 38, the value of the equalization parameter EQPR is adjusted so that the phase fluctuation amount detected by the inter-symbol interference monitor unit 52 becomes small. In the receiver circuit illustrated in FIG. 14, the adaptive equalization function is realized by such a series of operations.

However, a point that has to be noted here is that the output signal Dn of the data decision circuit 32 and the output signal Dn(b) of the boundary decision circuit 33 are used not only for the adaptive equalization function but for a CDR (Clock and Data Recovery) function. To dynamically change the phase of the clock signal DBT for the boundary decision circuit 33 is nothing but to generate noise internally, but when the phase of the clock signal DBT is changed at a speed equal to or higher than the bandwidth of the CDR function, this noise is removed by the CDR function. However, the convergence time of the equalization parameter EQPR to the optimal value by the adaptive equalization function may be adequately long, and in such a situation, changing the phase of the clock signal DBT at a high speed leads to increase in power consumption of the receiver circuit. Therefore, it is hard to say that the receiver circuit illustrated in FIG. 14 has a highly realizable structure.

Patent Document 1: Japanese Laid-open Patent Publication No. 2005-303607

Non-patent Document 1: Jan W. M. Bergmans, "Digital Baseband Transmission and Recording", Kluwer Academic Publishers, pp. 373-450, 1996

As a device for realizing adaptive equalization, one that performs feedback control for the equalization circuit based on information related to the amplitude of an output signal of an equalization circuit, as in the receiver circuit illustrated in FIG. 13, is generally used. However, problems such as increase in circuit scale and power consumption arise when making the LSI of the adaptive equalization control circuit, and thus a much simpler realization device is demanded. As a realization device responding to this demand, one that performs feedback control for the equalization circuit based on information related to the phase of an output signal of the equalization circuit, as in the receiver circuit illustrated in FIG. 14, is effective. However, the circuit structure for realizing the adaptive equalization function works in a manner to reduce the CDR function, and thus it is difficult to establish both the CDR function and the adaptive equalization function.

SUMMARY

According to an aspect of the embodiments, a receiver includes a first phase adjustment circuit adjusts phases of a data decision clock signal and a first boundary decision clock signal according to a phase adjustment amount based on an output signal of a data decision circuit and an output signal of a first boundary decision circuit, a second phase adjustment circuit adjusts a phase of a second boundary decision clock signal according to a result of adding the phase adjustment amount and a phase adjustment amount offset, and an adaptive equalization control circuit adjusts an equalization coefficient of an equalization circuit according to a data width of an output signal of the equalization circuit based on a logical comparison result between the output signal of the data decision circuit and an output signal of a second boundary decision circuit when the phase adjustment amount offset is changed.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIGS. 2A to 2H are explanatory diagrams illustrating the relationship between an output eye pattern and an equalization coefficient value in an equalization circuit;

DESCRIPTION OF EMBODIMENTS

Figure 1:
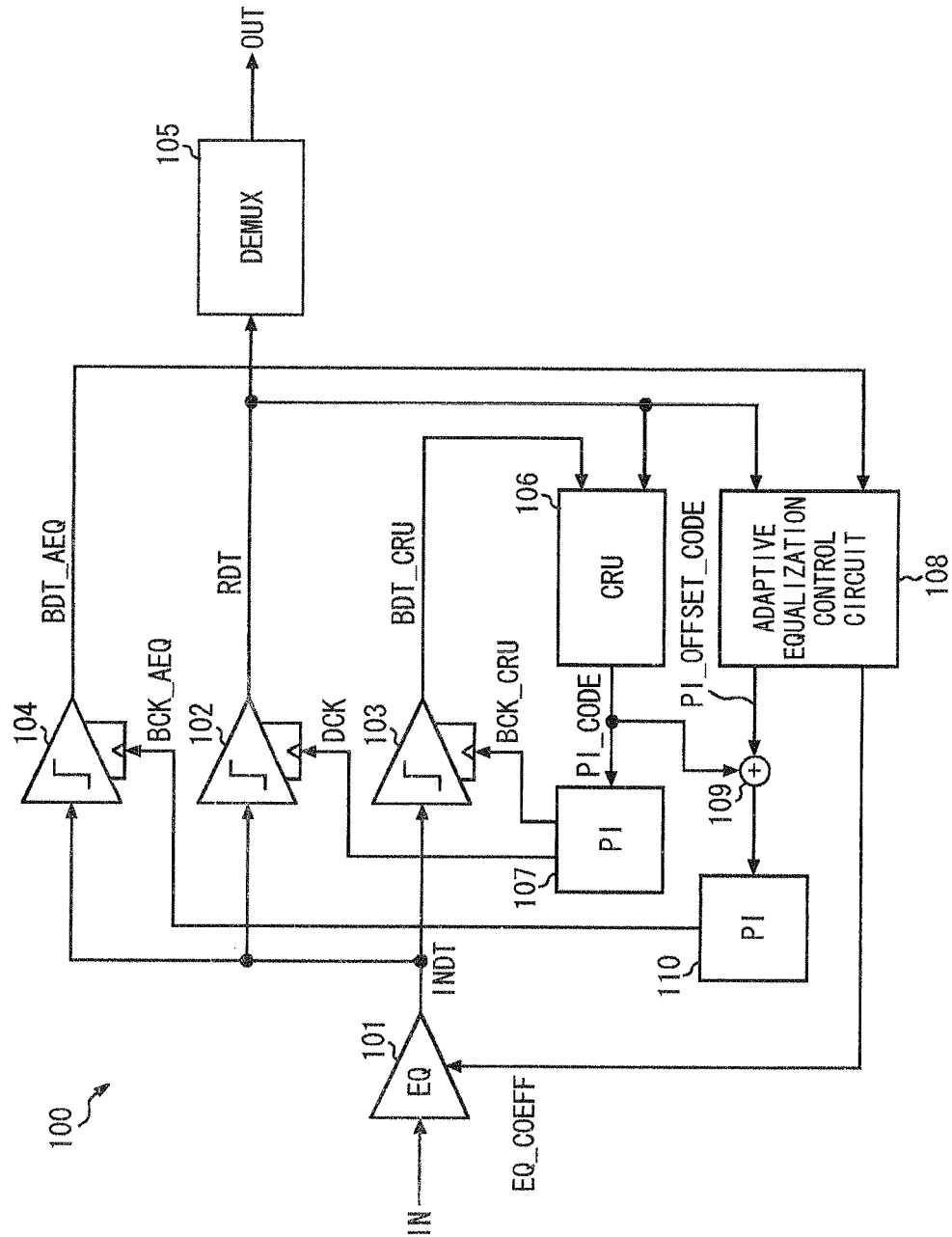
FIG. 1 is an explanatory diagram illustrating a first embodiment.

Hereinafter, embodiments will be described with reference to the drawings. FIG. 1 illustrates a first embodiment. A receiver circuit 100 of the first embodiment includes an equalization circuit (EQ) 101, a data decision circuit 102, boundary decision circuits 103, 104, a demultiplexer (DEMUX) 105, a clock recovery unit (CRU) 106, clock generation circuits (PI) 107, 110, an adaptive equalization control circuit 108, and an adder 109.

The equalization circuit 101 equalizes an input data signal IN with the equalization characteristic corresponding to the value of an equalization coefficient signal EQ_COEFF to generate an output signal INDT. The data decision circuit 102 makes a decision on the output signal INDT of the equalization circuit 101 in synchronization with a clock signal DCK to generate a received data signal RDT. The boundary decision circuit 103 makes a decision on the output signal INDT of the equalization circuit 101 in synchronization with a clock signal BCK_CRU to generate a boundary data signal BDT_CRU. The boundary decision circuit 104 makes a decision on the output signal INDT of the equalization circuit 101 in synchronization with a clock signal BCK_AEQ to generate a boundary data signal BDT_AEQ.

The demultiplexer 105 serial-to-parallel converts the received data signal RDT to generate an output data signal OUT. The clock recovery unit 106 detects the phase of the output signal INDT of the equalization circuit 101 based on the received data signal RDT and the boundary data signal BDT_CRU to generate a phase adjustment amount signal PI_CODE according to the detection result. The clock generation circuit 107 adjusts the phase of the clock signal DCK that defines a decision timing of the data decision circuit 102 and the phase of the clock signal BCK_CRU that defines a decision timing of the boundary decision circuit 103 based on the value of the phase adjustment amount signal PI_CODE.

The adaptive equalization control circuit 108 predicts the data width of the output signal INDT of the equalization circuit 101 based on the logical comparison result between the received data signal RDT and the boundary data signal BDT_AEQ when the value of a phase adjustment amount offset signal PI_OFFSET_CODE is changed, and adjusts the value of the equalization coefficient signal EQ_COEFF so that the data width of the output signal INDT of the equalization circuit 101 gets close to one-bit width. The adder 109 adds the value of the phase adjustment amount offset signal PI_OFFSET_CODE to the value of the phase adjustment amount signal PI_CODE, and generates an output signal indicating the addition result. The clock generation circuit 110 adjusts the phase of the clock signal BCK_AEQ that defines a decision timing of the boundary decision circuit 104 based on the value of the output signal of the adder 109.

FIGS. 2A to 2H illustrate the relationship between an eye pattern of the output signal INDT and the value of the equalization coefficient signal EQ_COEFF in the equalization circuit 101. As illustrated in FIGS. 2A to 2H, in the equalization circuit 101, a zero cross jitter width of the output signal INDT becomes small according to the value of the equalization coefficient signal EQ_COEFF, and the amplitude of the output signal INDT becomes large. In the adaptive equalization control circuit 108, such characteristics of the equalization circuit 101 are used to derive, as an optimal value, the value of the equalization coefficient signal EQ_COEFF that minimizes the zero cross jitter width of the output signal INDT of the equalization circuit 101, that is, the value of the equalization coefficient signal EQ_COEFF that makes the data width of the output signal INDT of the equalization circuit 101 to be closest to one-bit width. Here, in FIGS. 2A to 2H, when the value of the equalization coefficient signal EQ_COEFF is "0×3" (FIG. 2D), the zero cross jitter width of the output signal INDT of the equalization circuit 101 becomes minimum. Therefore, the optimal value of the equalization coefficient signal EQ_COEFF is "0×3".

The adaptive equalization control circuit 108 is provided with a first mode for deriving the optimal value of the equalization coefficient signal EQ_COEFF based on a first equalization coefficient derivation method and a second mode for deriving the optimal value of the equalization coefficient signal EQ_COEFF based on a second equalization coefficient derivation method. The first and second equalization coefficient derivation methods of the adaptive equalization control circuit 108 will be described below.

Figure 3A:
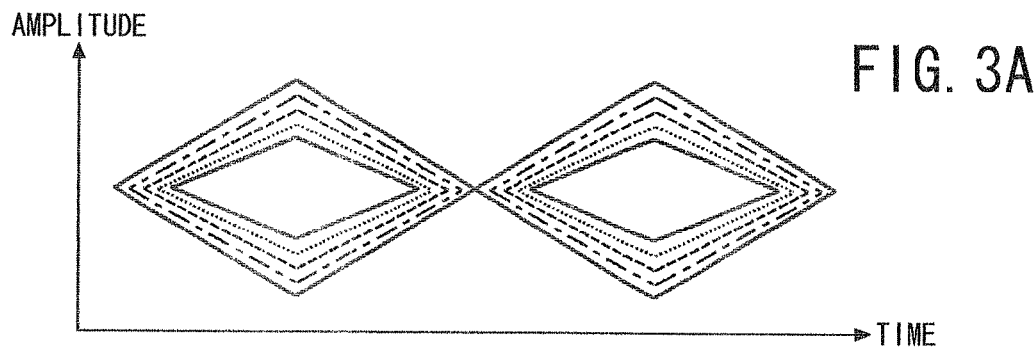
FIGS. 3A to 3C are explanatory diagrams illustrating an overview of a first equalization coefficient derivation method of an adaptive equalization control circuit.
Figure 3B:
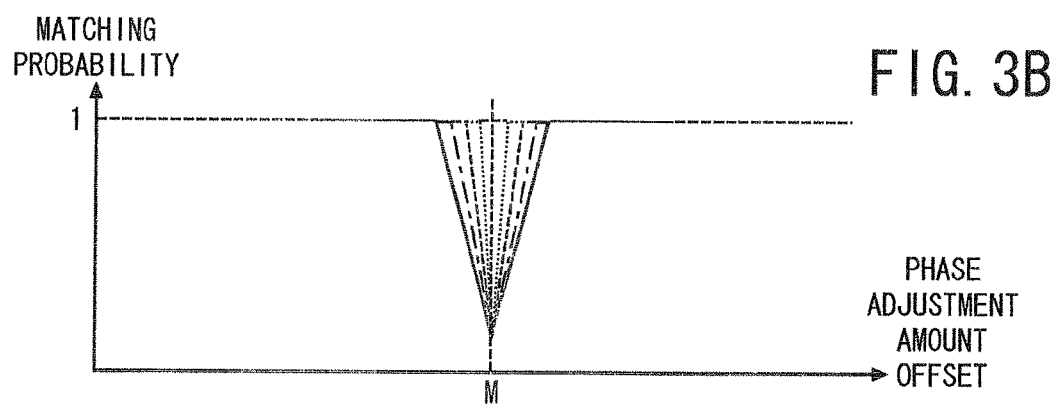
Figure 3C:
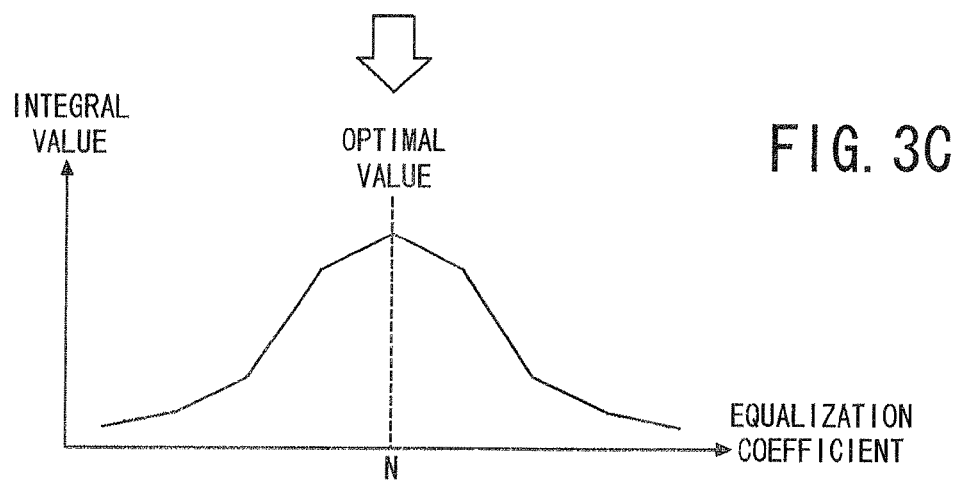

FIGS. 3A to 3C illustrate an overview of the first equalization coefficient derivation method of the adaptive equalization control circuit 108. Regarding the output signal INDT of the equalization circuit 101, the zero cross jitter width and the amplitude change according to the value of the equalization coefficient signal EQ_COEFF (FIG. 3A). Further, assuming that the value of the phase adjustment amount offset signal PI_OFFSET_CODE when the boundary data signal BDT_AEQ is located in between the received data signals RDT temporally adjacent thereto is "M", the closer the value of the phase adjustment amount offset signal PI_OFFSET_CODE to "M", the smaller the probability that the logical value of the received data signal RDT matches the logical value of the boundary data signal BDT_AEQ (FIG. 3B). Furthermore, when the value of the phase adjustment amount offset signal PI_OFFSET_CODE is close to "M", the smaller the zero cross jitter width of the output signal INDT of the equalization circuit 101, the smaller the probability that the logical value of the received data signal RDT matches the logical value of the boundary data signal BDT_AEQ. Note that in FIGS. 3A and 3B, differences in types of lines mean differences in values of the equalization coefficient signal EQ_COEFF.

Accordingly, in the first equalization coefficient derivation method, for every set value of the equalization coefficient signal EQ_COEFF, logical comparison processing of the received data signal RDT and the boundary data signal BDT_AEQ (processing to set a logical comparison result to "+1" when both the logical values match, and set a logical comparison result to "−1" when both the logical values do not match) is performed a given number of times and the logical comparison results are cumulatively added for each of set values of the phase adjustment amount offset signal PI_OFFSET_CODE, and the absolute value of the cumulative addition result is obtained. Then the value ("N") of the equalization coefficient EQ_COEFF that maximizes an integral value obtained by integrating absolute values of cumulative addition results with respect to a set range of the phase adjustment amount offset signal PI_OFFSET_CODE is decided as the optimal value (FIG. 3C). Thus, a state is obtained that the zero cross jitter width is minimum and the data width is closest to one-bit width, regarding the output signal INDT of the equalization circuit 101.

Figure 4A:
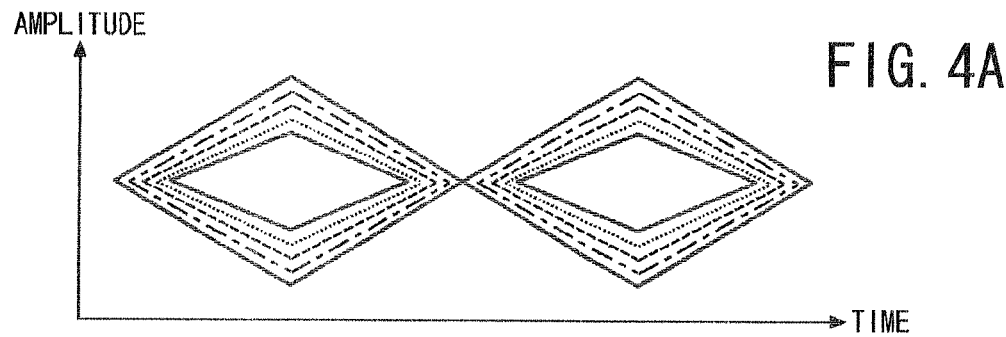
FIGS. 4A to 4C are explanatory diagrams illustrating an overview of a second equalization coefficient derivation method of an adaptive equalization control circuit.
Figure 4B:
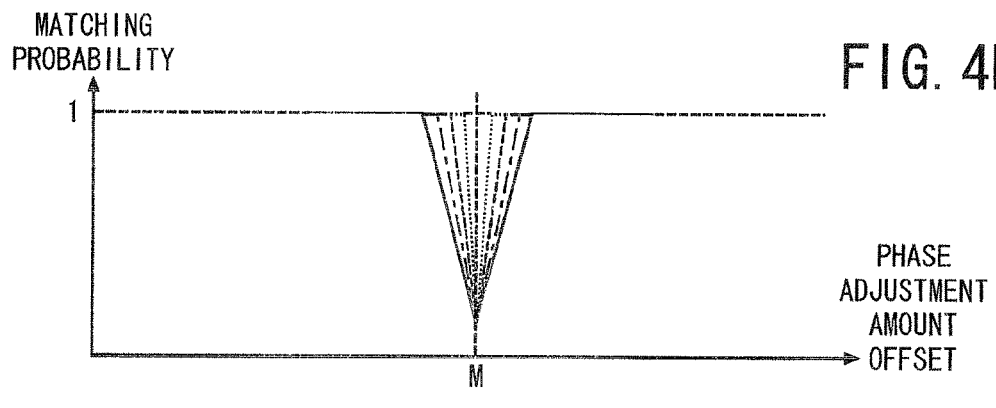
Figure 4C:

FIGS. 4A to 4C illustrate an overview of the second equalization coefficient derivation method of the adaptive equalization control circuit 108. As explained in the description of the first equalization coefficient derivation method, regarding the output signal INDT of the equalization circuit 101, the zero cross jitter width and the amplitude change according to the value of the equalization coefficient signal EQ_COEFF (FIG. 4A). Further, the closer the value of the phase adjustment amount offset signal PI_OFFSET_CODE to "M", the smaller the probability that the logical value of the received data signal RDT matches the logical value of the boundary data signal BDT_AEQ (FIG. 4B). Furthermore, when the value of the phase adjustment amount offset signal PI_OFFSET_CODE is close to "M", the smaller the zero cross jitter width of the output signal INDT of the equalization circuit 101, the smaller the probability that the logical value of the received data signal RDT matches the logical value of the boundary data signal BDT_AEQ.

Accordingly, in the second equalization coefficient derivation method, for every set value of the equalization coefficient signal EQ_COEFF, logical comparison processing of the received data signal RDT and the boundary data signal BDT_AEQ is performed a given number of times and the logical comparison results are cumulatively added for each of set values of the phase adjustment amount offset signal PI_OFFSET_CODE, and the absolute value of the cumulative addition result thereof is obtained. Then the value of the equalization coefficient signal EQ_COEFF that minimizes the range of the phase adjustment amount offset signal PI_OFFSET_CODE in which the logical matching probability of the received data signal RDT and the boundary data signal BDT_AEQ is smaller than one (for example, the range of the phase adjustment amount offset signal PI_OFFSET_CODE in which the absolute value of the cumulative addition result does not match the number of times of performing the logical comparison processing) is decided as the optimal value (FIG. 4C). Thus, a state is obtained that the zero cross jitter width is minimum and the data width is closest to one-bit width, regarding the output signal INDT of the equalization circuit 101.

Figure 5:
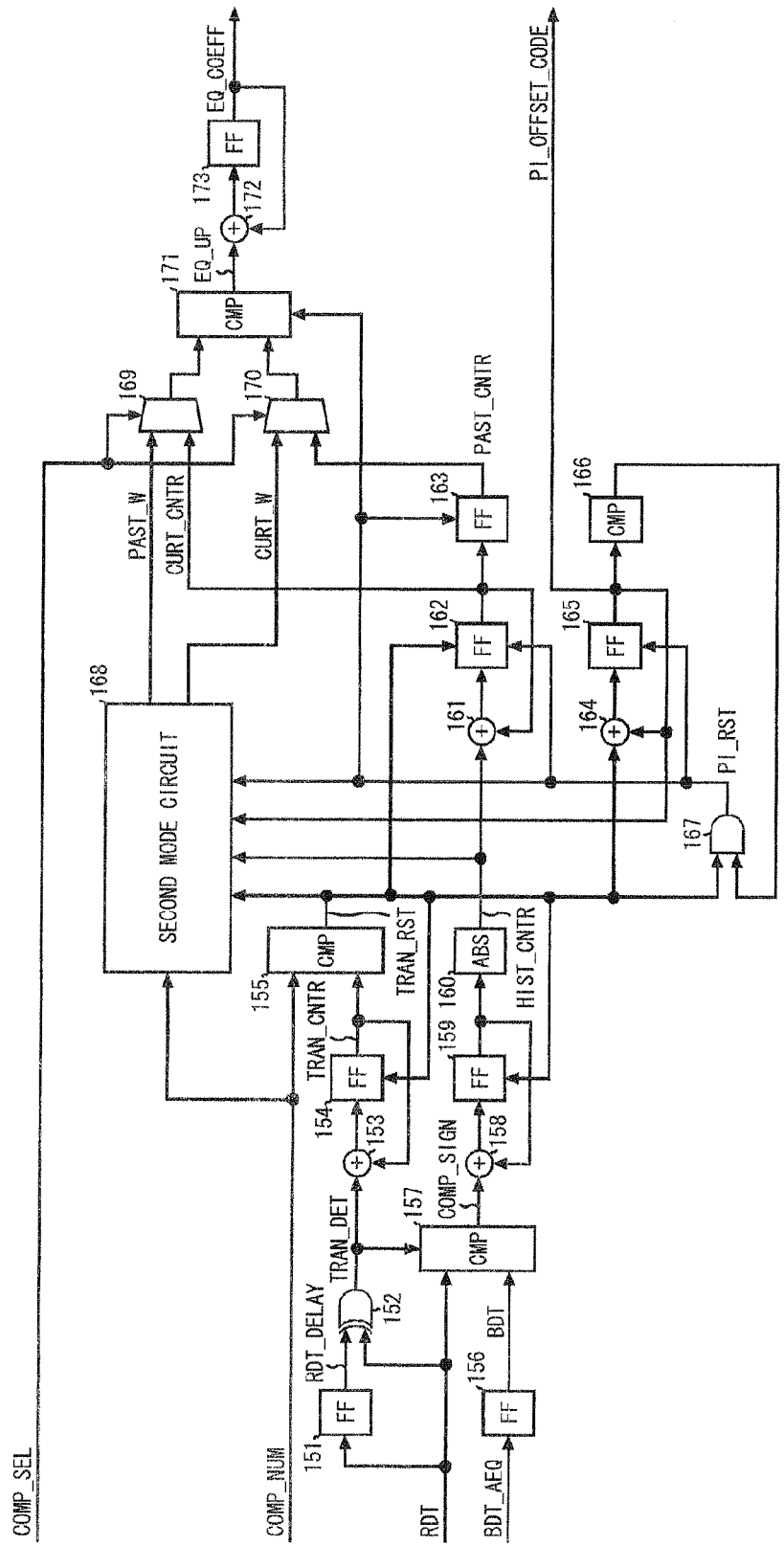
FIG. 5 is an explanatory diagram illustrating the structure of the adaptive equalization control circuit.

FIG. 5 illustrates the structure of the adaptive equalization control circuit 108. The adaptive equalization control circuit 108 includes flip-flops (FF) 151, 154, 156, 159, 162, 163, 165, 173, gate circuits 152, 167, comparators (CMP) 155, 157, 166, 171, adders 153, 158, 161, 164, 172, an absolute value circuit (ABS) 160, a second mode circuit 168, and selectors 169, 170.

The flip-flop 151 and the gate circuit 152 are circuits for detecting a transition of the received data signal RDT. The flip-flop 151 takes in the received data signal RDT in synchronization with a rising transition of the clock signal CLK (not illustrated) and outputs it as a received data signal RDT_DLY. The gate circuit 152 sets the value of a transition detection signal TRAN_DET to "1" when the value of the received data signal RDT does not match the value of the received data signal RDT_DLY, and sets the value of the transition detection signal TRAN_DET to "0" when the value of the received data signal RDT matches the value of the received data signal RDT_DLY.

The adder 153 and the flip-flop 154 are circuits for counting the number of times of detecting a transition of the received data signal RDT. The adder 153 adds the value of the transition detection signal TRAN_DET to the value of a transition detection number signal TRAN_CNTR, and generates an output signal indicating the addition result thereof. The flip-flop 154 takes in the output signal of the adder 153 in synchronization with a rising transition of the clock signal CLK and outputs it as the transition detection number signal TRAN_CNTR. Further, the flip-flop 154 takes in a transition detection reset signal TRAN_RST in synchronization with the rising transition of the clock signal CLK and initializes the value of the transition detection number signal TRAN_CNTR to "0" when the value of the transition detection reset signal TRAN_RST is "1".

The comparator 155 is a circuit for generating a timing to increment the value of the phase adjustment amount offset signal PI_OFFSET_CODE. The comparator 155 sets the value of the transition detection reset signal TRAN_RST to "1" when the value of the transition detection number signal TRAN_CNTR matches the value of a logical comparison number signal COMP_NUM, and sets the transition detection reset signal TRAN_RST to "0" when the value of the transition detection number signal TRAN_CNTR does not match the value of the logical comparison number signal COMP_NUM. Incidentally, the logical comparison number signal COMP_NUM is an external setting signal for indicating the number of times of performing logical comparison of the received data signal RDT and a boundary data signal BDT. The convergence time of the equalization coefficient signal EQ_COEFF to an optimal value depends on the number of times of performing the logical comparison of the received data signal RDT and the boundary data signal BDT. Therefore, the convergence time of the equalization coefficient signal EQ_COEFF to the optimal value can be adjusted via the logical comparison number signal COMP_NUM.

The flip-flop 156 takes in the boundary data signal BDT_AEQ in synchronization with a rising transition of the clock signal CLK and outputs it as the boundary data signal BDT. The phase of the boundary data signal BDT_AEQ is shifted by 0.5 UI (Unit Interval) relative to the phase of the received data signal RDT, and thus the boundary data signal BDT in phase with the received data signal RDT is generated as a logical comparison target of the received data signal RDT by the flip-flop 156.

The comparator 157 is a circuit for performing logical comparison of the received data signal RDT and the boundary data signal BDT accompanying a rising transition (transition of received data signal RDT) of the transition detection signal TRAN_DET. When the value of the transition detection signal TRAN_DET is "1" (when a transition of the received data signal RDT is detected), the comparator 157 sets the value of a logical comparison result signal COMP_SIGN to "+1" when the value of the received data signal RDT matches the value of the boundary data signal BDT, and sets the value of the logical comparison result signal COMP_SIGN to "−1" when the value of the received data signal RDT does not match the value of the boundary data signal BDT. Further, when the value of the transition detection signal TRAN_DET is "0" (when a transition of the received data signal RDT is not detected), the comparator 157 sets the value of the logical comparison result signal COMP_SIGN to "0" regardless of the received data signal RDT and the boundary data signal BDT.

The adder 158 and the flip-flop 159 are circuits for cumulatively adding the value of the logical comparison result signal COMP_SIGN. The adder 158 adds the value of the logical comparison result signal COMP_SIGN to the value of an output signal of the flip-flop 159, and generates an output signal indicating the addition result thereof. The flip-flop 159 takes in and outputs an output signal of the adder 158 in synchronization with a rising transition of the clock signal CLK. Further, the flip-flop 159 takes in the transition detection reset signal TRAN_RST in synchronization with the rising transition of the clock signal CLK and initializes the value of the output signal to "0" when the value of the transition detection reset signal TRAN_RST is "1". The absolute value circuit 160 obtains the absolute value regarding the value of the output signal of the flip-flop 159, and generates an addition result signal HIST_CNTR indicating this absolute value.

The adder 161 and the flip-flop 162 are circuits for deriving an integral value of the value of the addition result signal HIST_CNTR when the value of the phase adjustment amount offset signal PI_OFFSET_CODE is changed. The adder 161 adds the value of the addition result signal HIST_CNTR to the value of an integration result signal CURT_CNTR, and generates an output signal indicating the addition result thereof. The flip-flop 162 takes in the transition detection reset signal TRAN_RST in synchronization with the rising transition of the clock signal CLK, and takes in the output signal of the adder 161 and outputs it as the integration result signal CURT_CNTR when the value of the transition detection reset signal TRAN_RST is "1". Further, the flip-flop 162 takes in a phase adjustment reset signal PI_RST in synchronization with the rising transition of the clock signal CLK and initializes the value of the integration result signal CURT_CNTR to "0" when the value of the phase adjustment reset signal PI_RST is "1". The flip-flop 163 is a circuit for storing the value of the integration result signal CURT_CNTR. The flip-flop 163 takes in the phase adjustment reset signal PI_RST in synchronization with the rising transition of the clock signal CLK, and takes in the integration result signal CURT_CNTR and outputs it as an integration result signal PAST_CNTR when the value of the phase adjustment reset signal PI_RST is "1".

The adder 164 and the flip-flop 165 are circuits for incrementing the value of the phase adjustment amount offset signal PI_OFFSET_CODE accompanying a rising transition (a match of the value of the transition detection number signal TRAN_CNTR and the logical comparison number signal COMP_NUM) of the transition detection reset signal TRAN_RST.

The adder 164 adds the value of the transition detection reset signal TRAN_RST to the value of the phase adjustment amount offset signal PI_OFFSET_CODE, and generates an output signal indicating the addition result thereof. The flip-flop 165 takes in the output signal of the adder 164 in synchronization with the rising transition of the clock signal CLK and outputs it as the phase adjustment amount offset signal PI_OFFSET_CODE. Further, the flip-flop 165 takes in the phase adjustment reset signal PI_RST in synchronization with the rising transition of the clock signal CLK, and initializes the value of the phase adjustment amount offset signal PI_OFFSET_CODE to "0" when the value of the phase adjustment reset signal PI_RST is "1".

The comparator 166 and the gate circuit 167 are circuits for generating a timing to change the value of the equalization coefficient signal EQ_COEFF. The comparator 166 sets the value of an output signal to "1" when the value of the phase adjustment amount offset signal PI_OFFSET_CODE matches a given value (upper limit value of the phase adjustment amount offset signal PI_OFFSET_CODE), and sets the value of an output signal to "0" when the value of the phase adjustment amount offset signal PI_OFFSET_CODE does not match the given value. Note that the given value in the comparator 166 is changeable via a resistor or the like. That is, the set range of the phase adjustment amount offset signal PI_OFFSET_CODE is adjustable. The gate circuit 167 sets the value of the phase adjustment reset signal PI_RST to "1" when the value of the transition detection reset signal TRAN_RST and the value of the output signal of the comparator 166 are both "1", and otherwise sets the value of the phase adjustment reset signal PI_RST to "0".

The second mode circuit 168 generates jitter width signals CURT_W, PAST_W based on the logical comparison number signal COMP_NUM, the transition detection reset signal TRAN_RST, the addition result signal HIST_CNTR, the phase adjustment amount offset signal PI_OFFSET_CODE, and the phase adjustment reset signal PI_RST. Here, the second mode circuit 168 is operated constantly irrespective of the value of a mode selection signal COMP_SEL, but for the purpose of reduction in power consumption, the second mode circuit 168 may be operated when the value of the mode selection signal COMP_SEL is "1". In addition, details of the second mode circuit 168 will be described later using FIG. 6.

The selector 169 selects and outputs the integration result signal CURT_CNTR when the value of the mode selection signal COMP_SEL is "0", and selects and outputs the jitter width signal PAST_W when the value of the mode selection signal COMP_SEL is "1". The selector 170 selects and outputs the integration result signal PAST_CNTR when the value of the mode selection signal COMP_SEL is "0", and selects and outputs the jitter width signal CURT_W when the value of the mode selection signal COMP_SEL is "1". In addition, the mode selection signal COMP_SEL is an external setting signal for indicating the operation mode of the adaptive equalization control circuit 108. The value of the mode selection signal COMP_SEL is set to "0" when indicating the first mode of the adaptive equalization control circuit 108, and set to "1" when indicating the second mode of the adaptive equalization control circuit 108.

The comparator 171, the adder 172 and the flip-flop 173 are circuits for changing the value of the equalization coefficient signal EQ_COEFF accompanying a rising transition of the phase adjustment reset signal PI_RST (a match of the value of the transition detection number signal TRAN_CNTR and the value of the logical comparison number signal COMP_NUM in a state that a match of the value of the phase adjustment amount offset signal PI_OFFSET_CODE and the given value is detected). Where the value of the phase adjustment reset signal PI_RST is "1", the comparator 171 sets the value of a coefficient control signal EQ_UP to "+1" when the value of the output signal of the selector 169 is equal to or larger than the value of the output signal of the selector 170, and sets the value of the coefficient control signal EQ_UP to "−1" when the value of the output signal of the selector 169 is smaller than the value of the output signal of the selector 170. Further, where the value of the phase adjustment reset signal PI_RST is "0", the comparator 171 sets the value of the coefficient control signal EQ_UP to "0" regardless of the output signal of the selectors 169, 170. The adder 172 adds the value of the coefficient control signal EQ_UP to the value of the equalization coefficient signal EQ_COEFF, and generates an output signal indicating the addition result thereof. The flip-flop 173 takes in the output signal of the adder 172 in synchronization with the rising transition of the clock signal CLK and outputs it as the equalization coefficient signal EQ_COEFF.

Figure 6:
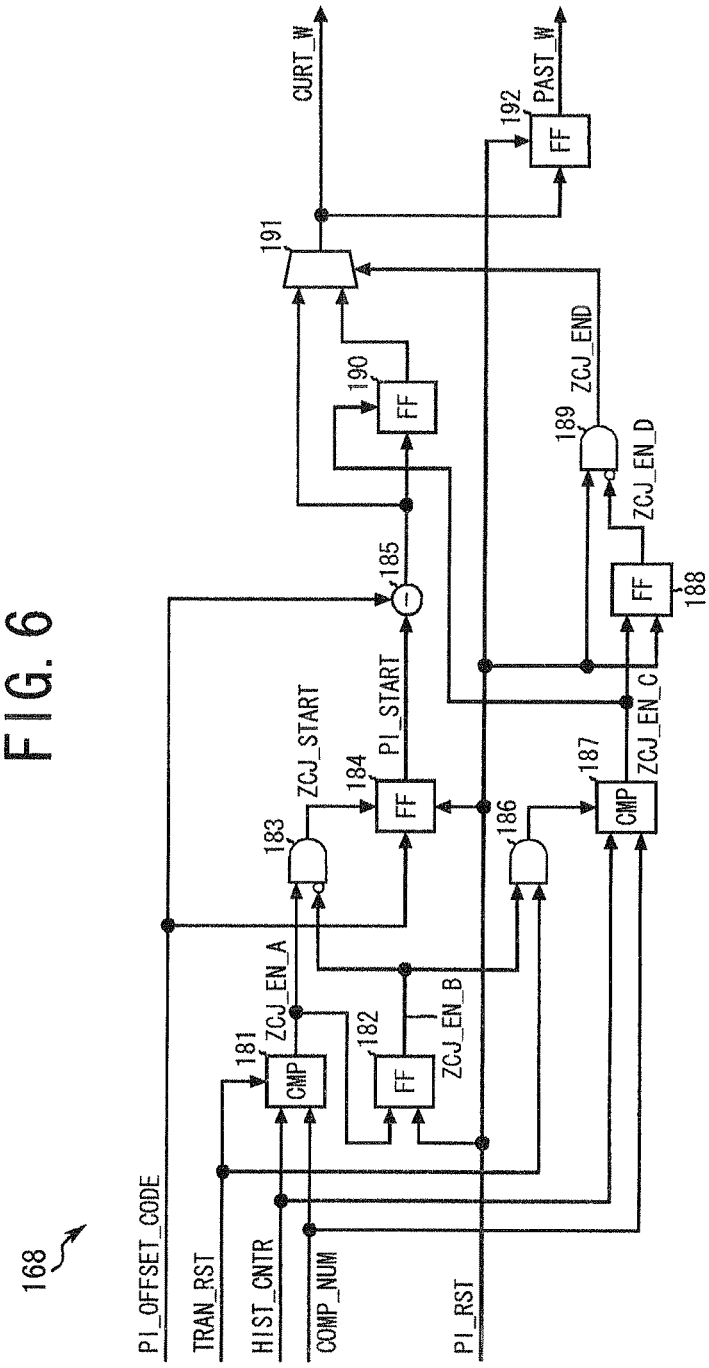
FIG. 6 is an explanatory diagram illustrating the structure of a second mode circuit.

FIG. 6 illustrates the structure of the second mode circuit 168. The second mode circuit 168 includes comparators (CMP) 181, 187, flip-flops (FF) 182, 184, 188, 190, 192, a subtractor 185, gate circuits 183, 186, 189, and a selector 191. The comparator 181 is a circuit for detecting that the logical matching probability of the received data signal ROT and the boundary data signal BDT is less than 1. Where the value of the transition detection reset signal TRAN_RST is "1", the comparator 181 sets the value of an output signal ZCJ_EN_A to "1" when the value of the addition result signal HIST_CNTR does not match the value of the logical comparison number signal COMP_NUM, and sets the value of the output signal ZCJ_EN_A to "0" when the value of the addition result signal HIST_CNTR matches the value of the logical comparison number signal COMP_NUM. Further, where the value of the transition detection reset signal TRAN_RST is "0", the comparator 181 sets the output signal ZCJ_EN_A to "0" regardless of the addition result signal HIST_CNTR and the logical comparison number signal COMP_NUM.

The flip-flop 182 is a circuit for storing whether or not it is detected that the logical matching probability of the received data signal RDT and the boundary data signal BDT is less than one. The flip-flop 182 takes in the output signal ZCJ_EN_A of the comparator 181 and the phase adjustment reset signal PI_RST in synchronization with the rising transition of the clock signal CLK, and sets the value of an output signal ZCJ_EN_B to "1" when the value of the output signal ZCJ_EN_A of the comparator 181 is "1" and initializes the value of the output signal ZCJ_EN_B to "0" when the value of the phase adjustment reset signal PI_RST is "1".

The gate circuit 183 and the flip-flop 184 are circuits for storing the value of the phase adjustment amount offset signal PI_OFFSET_CODE when it is detected that the logical matching probability of the received data signal RDT and the boundary data signal BDT is less than one in a state that the value of the output signal ZCJ_EN_B of the flip-flop 182 is "0". The gate circuit 183 sets the value of an output signal ZCJ_START to "1" when the value of the output signal ZCJ_EN_A of the comparator 181 is "1" and the value of the output signal ZCJ_EN_B of the flip-flop 182 is "0", and otherwise sets the value of the output signal ZCJ_START to "0". The flip-flop 184 takes in the output signal ZCJ_START of the gate circuit 183 in synchronization with the rising transition of the clock signal CLK, and takes in the phase adjustment amount offset signal PI_OFFSET_CODE and generates an output signal PI_START when the value of the output signal ZCJ_START of the gate circuit 183 is "1". Further, the flip-flop 184 takes in the phase adjustment reset signal PI_RST in synchronization with the rising transition of the clock signal CLK, and initializes the value of the output signal PI_START to "0" when the value of the phase adjustment reset signal PI_RST is "1". The subtractor 185 subtracts the value of the output signal PI_START of the flip-flop 184 from the value of the phase adjustment amount offset signal PI_OFFSET_CODE, and generates an output signal indicating the subtraction result thereof.

The gate circuit 186 and the comparator 187 are circuits for detecting that the logical matching probability of the received data signal RDT and the boundary data signal BDT has become one accompanying a change of the value of the phase adjustment amount offset signal PI_OFFSET_CODE after it is detected that the logical matching probability of the received data signal RDT and the boundary data signal BDT is less than one. The gate circuit 186 sets the value of an output signal to "1" when the value of the transition detection reset signal TRAN_RST and the value of the output signal ZCJ_EN_B of the flip-flop 182 are both "1", and otherwise sets the value of the output signal to "0". Where the value of the output signal of the gate circuit 186 is "1", the comparator 187 sets an output signal ZCJ_EN_C to "1" when the value of the addition result signal HIST_CNTR matches the value of the logical comparison number signal COMP_NUM, and sets the output signal ZCJ_EN_C to "0" when the value of the addition result signal HIST_CNTR does not match the value of the logical comparison number signal COMP_NUM. Further, where the value of the output signal of the gate circuit 186 is "0", the comparator 187 sets the value of the output signal ZCJ_EN_C to "0" regardless of the addition result signal HIST_CNTR and the logical comparison number signal COMP_NUM.

The flip-flop 188 and the gate circuit 189 are circuits for responding to a situation that the logical matching probability of the received data signal RDT and the boundary data signal BDT does not become one, even when the value of the phase adjustment amount offset signal PI_OFFSET_CODE reaches the upper limit value after it is detected that the logical matching probability of the received data signal RDT and the boundary data signal BDT is less than one. The flip-flop 188 takes in the output signal ZCJ_EN_C of the comparator 187 and the phase adjustment reset signal PI_RST in synchronization with the rising transition of the clock signal CLK, and sets the value of an output signal ZCJ_EN_D to "1" when the value of the output signal ZCJ_EN_C of the comparator 187 is "1" and initializes the value of the output signal ZCJ_EN_D to "0" when the value of the phase adjustment reset signal PI_RST is "1". The gate circuit 189 sets the value of an output signal ZCJ_END to "1" when the value of the phase adjustment reset signal PI_RST is "1" and the value of the output signal ZCJ_EN_D of the flip-flop 188 is "0", and otherwise sets the value of the output signal ZCJ_END to "0".

The flip-flop 190 is a circuit for storing a range of the phase adjustment amount offset signal PI_OFFSET_CODE (corresponding to the zero cross jitter width of the output signal INDT of the equalization circuit 101) in which the logical matching probability of the received data signal RDT and the boundary data signal BDT becomes less than one. The flip-flop 190 takes in the output signal ZCJ_EN_C of the comparator 187 in synchronization with the rising transition of the clock signal CLK, and takes in and outputs the output signal of the subtractor 185 when the value of the output signal ZCJ_EN_C of the comparator 187 is "1".

The selector 191 is a circuit for selectively setting the value of the jitter width signal CURT_W. The selector 191 selects the output signal of the flip-flop 190 and outputs it as the jitter width signal CURT_W when the value of output signal ZCJ_END of the gate circuit 189 is "0", and selects the output signal of the subtractor 185 and outputs it as the jitter width signal CURT_W when the value of the output signal ZCJ_END of the gate circuit 189 is "1".

The flip-flop 192 is a circuit for storing the value of the jitter width signal CURT_W. The flip-flop 192 takes in the phase adjustment reset signal PI_RST in synchronization with the rising transition of the clock signal CLK, and takes in the jitter width signal CURT_W and outputs it as the jitter width signal PAST_W when the value of the phase adjustment reset signal PI_RST is "1".

In the second mode circuit 168 as above, the difference between the value of the phase adjustment amount offset signal PI_OFFSET_CODE and the value of the output signal PI_START of the flip-flop 184 (value of the phase adjustment amount offset signal PI_OFFSET_CODE when the value of the output signal ZCJ_START of the gate circuit 183 is set to "1") is stored in the flip-flop 190 every time the value of the output signal ZCJ_EN_C of the comparator 187 is set to "1". Therefore, even when a slit exists in the zero cross jitter of the output signal INDT of the equalization circuit 101, the range of the phase adjustment amount offset signal PI_OFFSET_CODE corresponding to the zero cross jitter width is derived securely.

Further, when a match of the value of the addition result signal HIST_CNTR and the value of the logical comparison number signal COMP_NUM is not detected even when the value of the phase adjustment amount offset signal PI_OFFSET_CODE reaches the upper limit value after the value of the output signal ZCJ_START of the gate circuit 183 is set to "1", the value of the output signal ZCJ_END of the gate circuit 189 is set to "1" accompanying that the value of the phase adjustment reset signal PI_RST is set to "1". Therefore, in such a situation, the value of the jitter width signal CURT_W is set to the difference between the upper limit value of the phase adjustment amount offset signal PI_OFFSET_CODE and the value of the output signal PI_START of the flip-flop 184.

Figure 7:
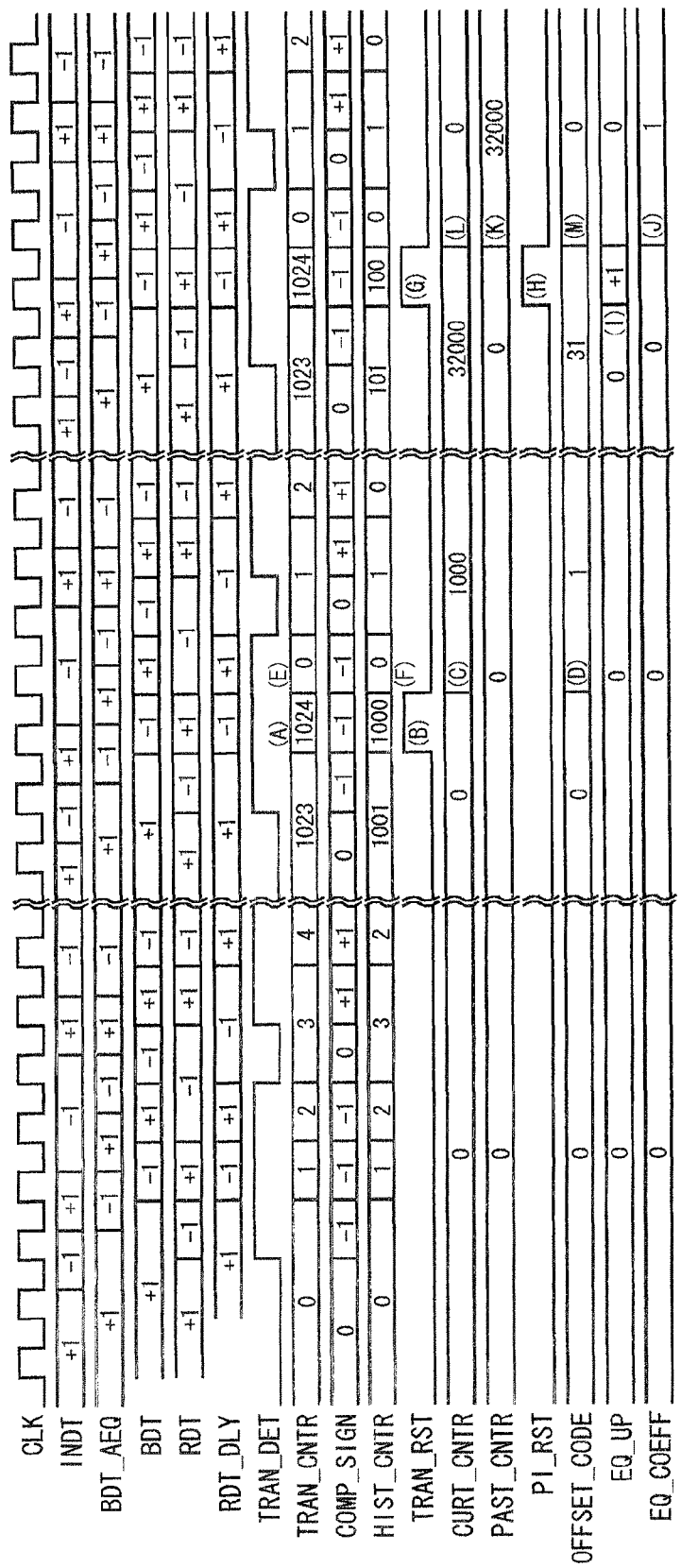
FIG. 7 is an explanatory diagram illustrating an operation example (first mode) of the adaptive equalization control circuit.

FIG. 7 illustrates an operation example (first mode) of the adaptive equalization control circuit 108. In the operation example of the adaptive equalization control circuit 108 illustrated in FIG. 7, it is assumed that the value of a mode selection signal CONP_SEL is set to "0". Further, it is assumed that the value of the logical comparison number signal COMP_NUM is set to "1024". Furthermore, it is assumed that the clock generation circuit 110 has a resolution of 0.03125 UI with respect to the phase of the clock signal BCK_AEQ. That is, the clock generation circuit 110 is capable of adjusting a decision timing of the output signal INDT of the equalization circuit 101 in the boundary decision circuit 104 in units of 1/32 UI. Therefore, it is assumed that the upper limit value of the phase adjustment amount offset signal PI_OFFSET_CODE (given value in the comparator 166) is set to "31".

Since the value of the logical comparison number signal COMP_NUM is set to "1024", the value of the transition detection reset signal TRAN_RST is set to "1" ((B) in FIG. 7) when the value of the transition detection number signal TRAN_CNTR reaches "1024" ((A) in FIG. 7). Accordingly, the value of the addition result signal HIST_CNTR ("1000") is added to the value ("0") of the integration result signal CURT_CNTR, thereby updating the value of the integration result signal CURT_CNTR from "0" to "1000" ((C) in FIG. 7). Further, the value ("1") of the transition detection reset signal TRAN_RST is added to the value ("0") of the phase adjustment amount offset signal PI_OFFSET_CODE, thereby updating the value of the phase adjustment amount offset signal PI_OFFSET_CODE from "0" to "1" ((D) in FIG. 7). Simultaneously, the value of the transition detection number signal TRAN_CNTR is initialized to "0" ((E) in FIG. 7), and the value of the addition result signal HIST_CNTR is initialized to "0" ((F) in FIG. 7).

Further, since the upper limit value of the phase adjustment amount offset signal PI_OFFSET_CODE is set to "31", the value of the phase adjustment reset signal PI_RST is set to "1" ((H) in FIG. 7) when the value of the transition detection reset signal TRAN_RST is set to "1" ((G) in FIG. 7) in a state that the value of the phase adjustment amount offset signal PI_OFFSET_CODE reached "31". At this time, the value ("32000") of the integration result signal CURT_CNTR is larger than the value ("0") of the integration result signal PAST_CNTR, and thus the value of the coefficient control signal EQ_UP is set to "+1" ((I) in FIG. 7). Thus, the value ("+1") of the coefficient control signal EQ_UP is added to the value ("0") of the equalization coefficient signal EQ_COEFF, thereby updating the value of the equalization coefficient signal EQ_COEFF from "0" to "1" ((J) in FIG. 7). Further, when the value of the phase adjustment reset signal PI_RST is set to "1", the value of the integration result signal PAST_CNTR is update from "0" to the value ("32000") of the integration result signal CURT_CNTR ((K) in FIG. 7). Then the value of the integration result signal CURT_CNTR is initialized to "0" ((L) in FIG. 7), and the value of the phase adjustment amount offset signal PI_OFFSET_CODE is initialized to "0" ((M) in FIG. 7).

Figure 8:
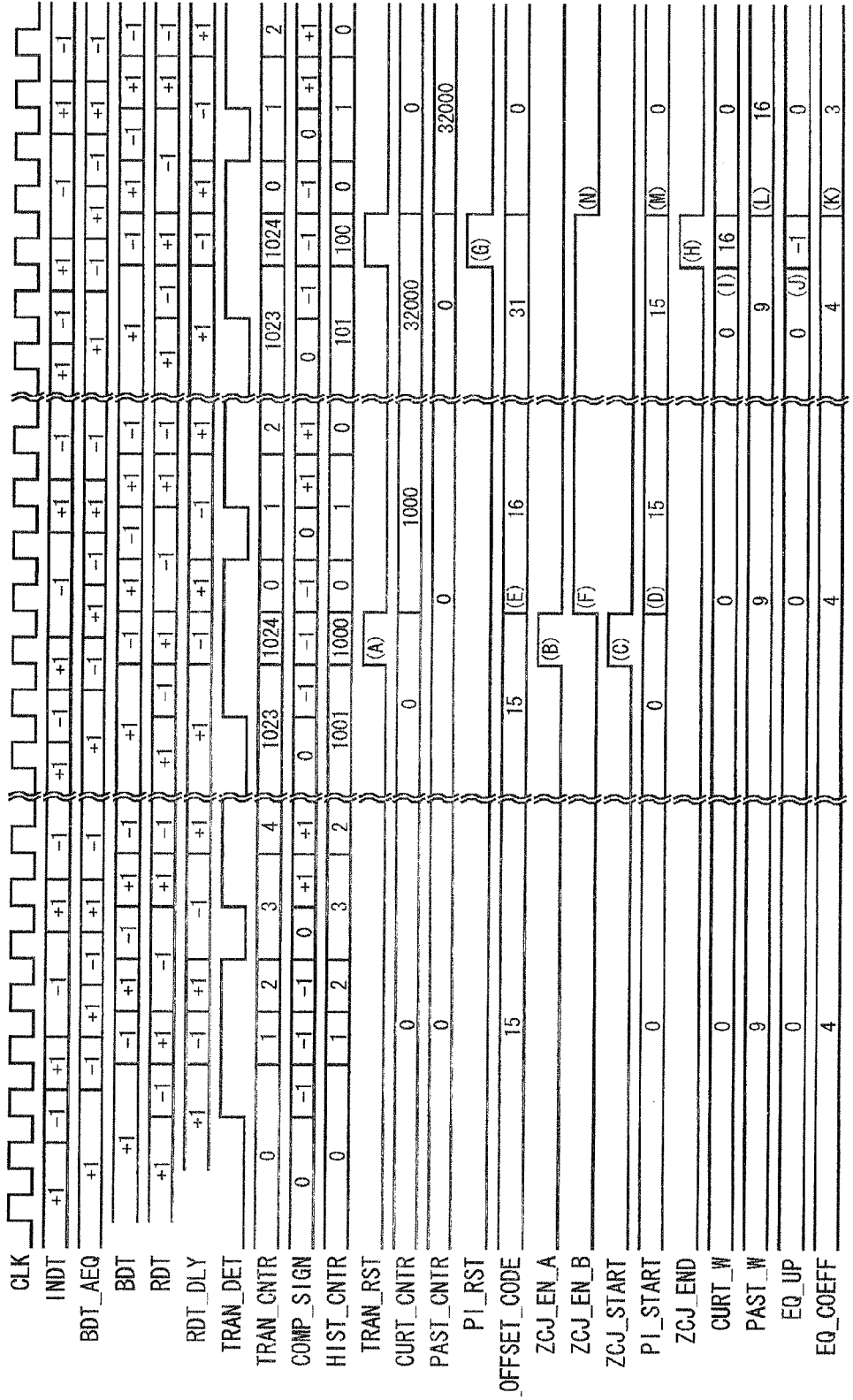
FIG. 8 is an explanatory diagram illustrating an operation example (second mode) of the adaptive equalization control circuit.
Figure 9:
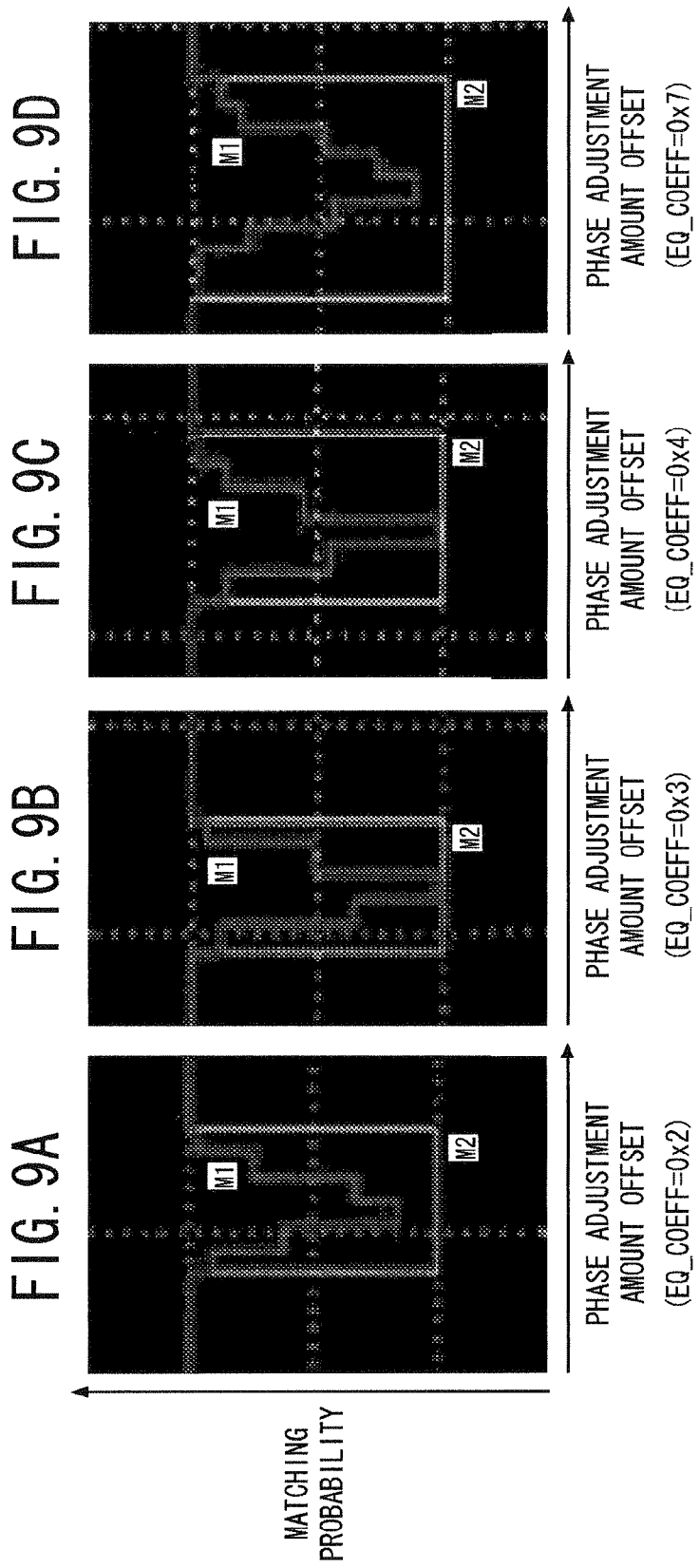
FIGS. 9A to 9D are explanatory diagrams illustrating simulation results of the equalization coefficient derivation methods of the adaptive equalization control circuit.

FIG. 8 illustrates an operation example (second mode) of the adaptive equalization control circuit 108. In the operation example of the adaptive equalization control circuit 108 illustrated in FIG. 8, it is assumed that the value of the mode selection signal CONP_SEL is set to "1". Further, it is assumed that, similarly to the operation example of the adaptive equalization control circuit 108 illustrated in FIG. 7, the value of the logical comparison number signal COMP_NUM is set to "1024". Furthermore, it is assumed that the clock generation circuit 110 has a resolution of 0.03125 UI with respect to the phase of the clock signal BCK_AEQ. Therefore, it is assumed that the upper limit value of the phase adjustment amount offset signal PI_OFFSET_CODE is set to "31". Note that upon describing the operation example of the adaptive equalization control circuit 108 illustrated in FIG. 8, descriptions of operations similar to the operations described in the operation example of the adaptive equalization control circuit 108 illustrated in FIG. 7 will be omitted.

When the value of the transition detection reset signal TRAN_RST is set to "1" in a state that the value of the equalization coefficient signal EQ_COEFF is "4" and the value of the phase adjustment amount offset signal PI_OFFSET_CODE is "15" ((A) in FIG. 8), the value ("1000") of the addition result signal HIST_CNTR does not match the value ("1024") of the logical comparison number signal COMP_NUM, and thus the value of the output signal ZCJ_EN_A of the comparator 181 is set to "1" ((B) in FIG. 8). At this time, the value of the output signal ZCJ_EN_B of the flip-flop 182 is "0". Thus, the value of the output signal ZCJ_START of the gate circuit 183 is set to "1" ((C) in FIG. 8), and the value of the output signal PI_START of the flip-flop 184 is updated from "0" to the value ("15") of the phase adjustment amount offset signal PI_OFFSET_CODE ((D) in FIG. 8). Further, when the value of the transition detection reset signal TRAN_RST is set to "1", the value of the phase adjustment amount offset signal PI_OFFSET_CODE is updated from "15" to "16" ((E) in FIG. 8). Simultaneously, the value of the output signal ZCJ_EN_B of the flip-flop 182 is set to "1" ((F) in FIG. 8).

When the value of the transition detection reset signal TRAN_RST is set to "1" in a state that the phase adjustment amount offset signal PI_OFFSET_CODE reached "31", the value of the phase adjustment reset signal PI_RST is set to "1" ((G) in FIG. 8). At this time, the value ("100") of the addition result signal HIST_CNTR does not match the value ("1024") of the logical comparison number signal COMP_NUM, and thus the value of the output signal ZCJ_END of the gate circuit 189 is set to "1" ((H) in FIG. 8). As a result, the value of the jitter width signal CURT_W is set to the value ("16") of the output signal of the subtractor 185 ((I) in FIG. 8). In this situation, the value ("9") of the jitter width signal PAST_W is smaller than the value ("16") of the jitter width signal CURT_W, and thus the value of the coefficient control signal EQ_UP is set to "−1" ((J) in FIG. 8). Accordingly, the value ("−1") of the coefficient control signal EQ_UP is added to the value ("4") of the equalization coefficient signal EQ_COEFF, thereby updating the value of the equalization coefficient signal EQ_COEFF from "4" to "3" ((K) in FIG. 8). Further, when the value of the phase adjustment reset signal PI_RST is set to "1", the value of the jitter width signal PAST_W is updated from "9" to the value ("16") of the jitter width signal CURT_W ((L) in FIG. 8). Then the value of the output signal PI_START of the flip-flop 184 is initialized to "0" ((M) in FIG. 8), and the value of the output signal ZCJ_EN_B of the flip-flop 182 is initialized to "0" ((N) in FIG. 8).

Thus, when a match of the value of the addition result signal HIST_CNTR and the value of the logical comparison number signal COMP_NUM is not detected even when the value of the phase adjustment amount offset signal PI_OFFSET_CODE reaches the upper limit value ("31") after the value of the output signal ZCJ_START of the gate circuit 183 is set to "1" in a state that the value of the phase adjustment amount offset signal PI_OFFSET_CODE is "15", the value of the output signal ZCJ_END of the gate circuit 189 is set to "1" accompanying that the value of the phase adjustment reset signal PI_RST is set to "1". As a result, the value of the jitter width signal CURT_W is set to the difference ("16") between the upper limit value ("31") of the phase adjustment amount offset signal PI_OFFSET_CODE and the value ("15") of the output signal PI_START of the flip-flop 184.

FIGS. 9A to 9D illustrate simulation results of the equalization coefficient derivation methods of the adaptive equalization control circuit 108. FIGS. 9A to 9D represent a relationship (M1: a simulation result of the first equalization coefficient derivation method, M2: a simulation result of the second equalization coefficient derivation method) between the logical matching probability of the received data signal RDT and the boundary data signal BDT (corresponding to the ratio of the value of the addition result signal HIST_CNTR to the value of the logical comparison number signal COMP_NUM) and the value of the phase adjustment amount offset signal PI_OFFSET_CODE, when the value of the equalization coefficient signal EQ_COEFF is "0×2", "0×3", "0×4", and "0×7". Note that in FIGS. 9A to 9D, the simulation result M2 of the second equalization coefficient derivation method is represented such that the logical matching probability of the received data signal RDT and the boundary data signal BDT when a mismatch of the value of the addition result signal HIST_CNTR and the value of the logical comparison number signal COMP_NUM is detected is smallest. From the simulation results of the equalization coefficient derivation methods of the adaptive equalization control circuit 108 illustrated in FIGS. 9A to 9D, it can be seen that "0×3" is derived as an optimal value of the equalization coefficient signal EQ_COEFF, and the effectiveness can be verified.

In addition, the first equalization coefficient derivation method of the adaptive equalization control circuit 108 is effective when the histogram of the zero cross jitter for the output signal INDT of the equalization circuit 101 is represented by a normal distribution. However, in the first equalization coefficient derivation method of the adaptive equalization control circuit 108, when a slit exists in the zero cross jitter of the output signal INDT of the equalization circuit 101, that is, the histogram of the zero cross jitter is not represented by a normal distribution for the output signal INDT of the equalization circuit 101, it may be possible that the value of the equalization coefficient signal EQ_COEFF does not converge to an optimal value. On the other hand, in the second equalization coefficient derivation method of the adaptive equalization control circuit 108, the value of the equalization coefficient signal EQ_COEFF converges securely to the optimal value even when the histogram of the zero cross jitter is not represented by a normal distribution for the output signal INDT of the equalization circuit 101.

In the first embodiment as described above, the boundary circuit 103 and the clock generation circuit 107 used for the CDR function and the boundary decision circuit 104 and the clock generation circuit 110 used for the adaptive equalization function are provided separately. Thus, the circuit structure for realizing the adaptive equalization function does not affect the CDR function. Therefore, the CDR function and the adaptive equalization function can both be established, and a receiver circuit with higher possibility of realization can be provided.

Figure 10:
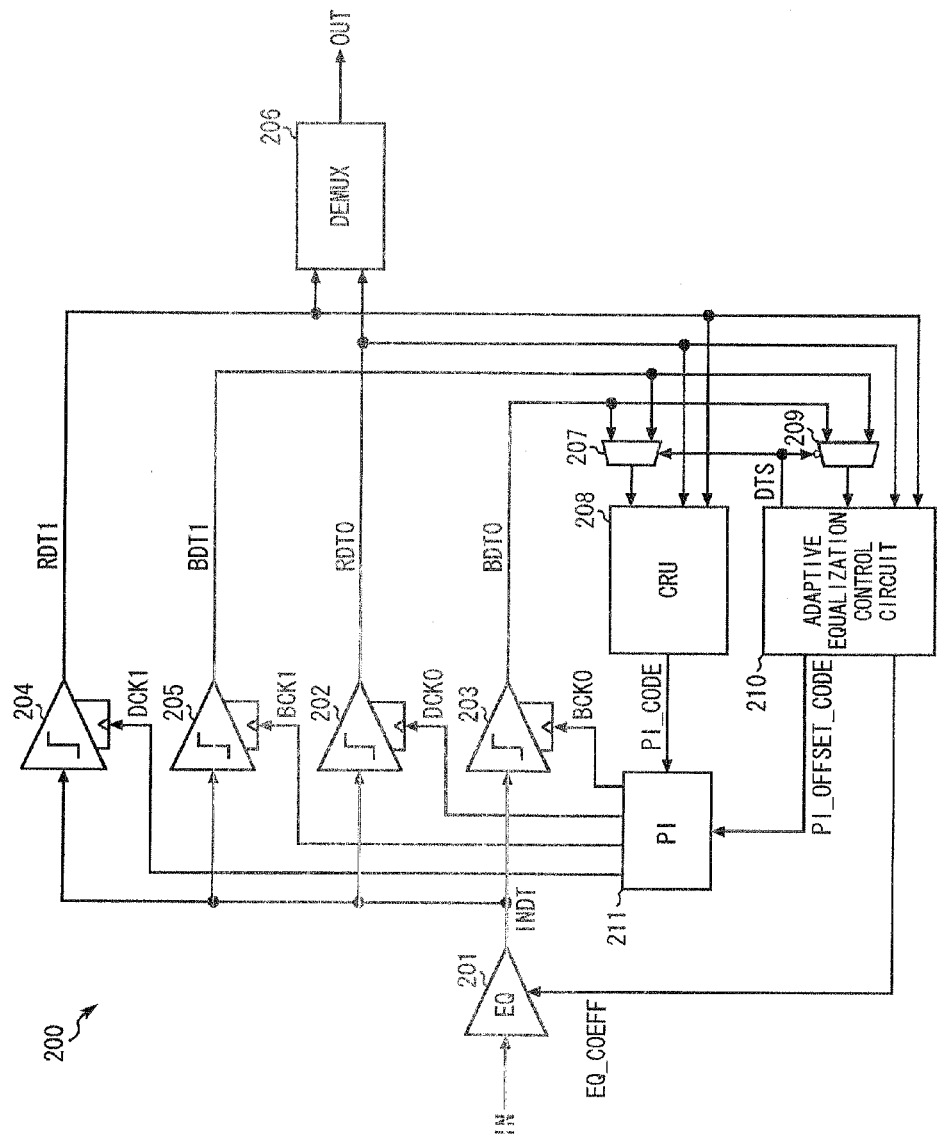
FIG. 10 is an explanatory diagram illustrating a second embodiment.
Figure 11A:
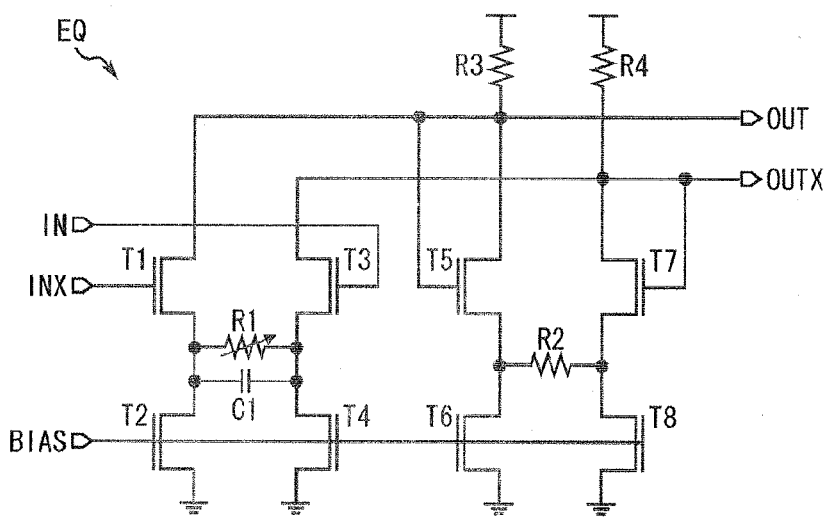
FIGS. 11A and 11B are explanatory diagrams illustrating an example of an equalization circuit.
Figure 11B:
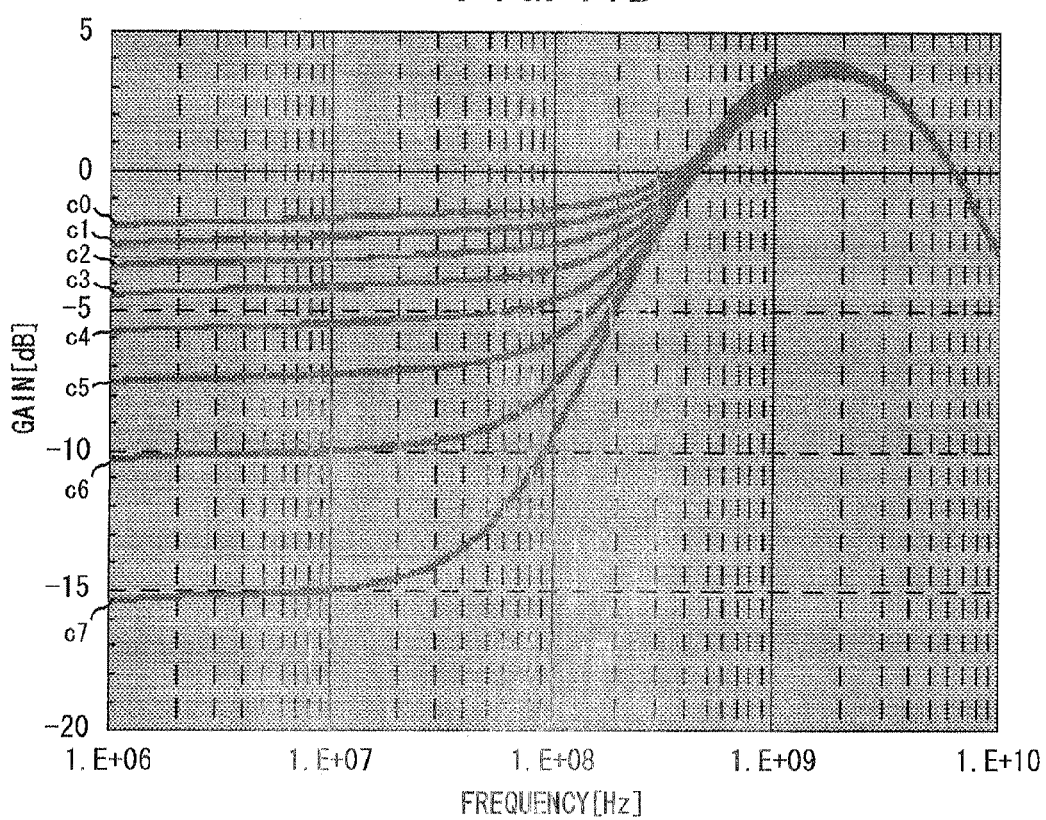
Figure 12:
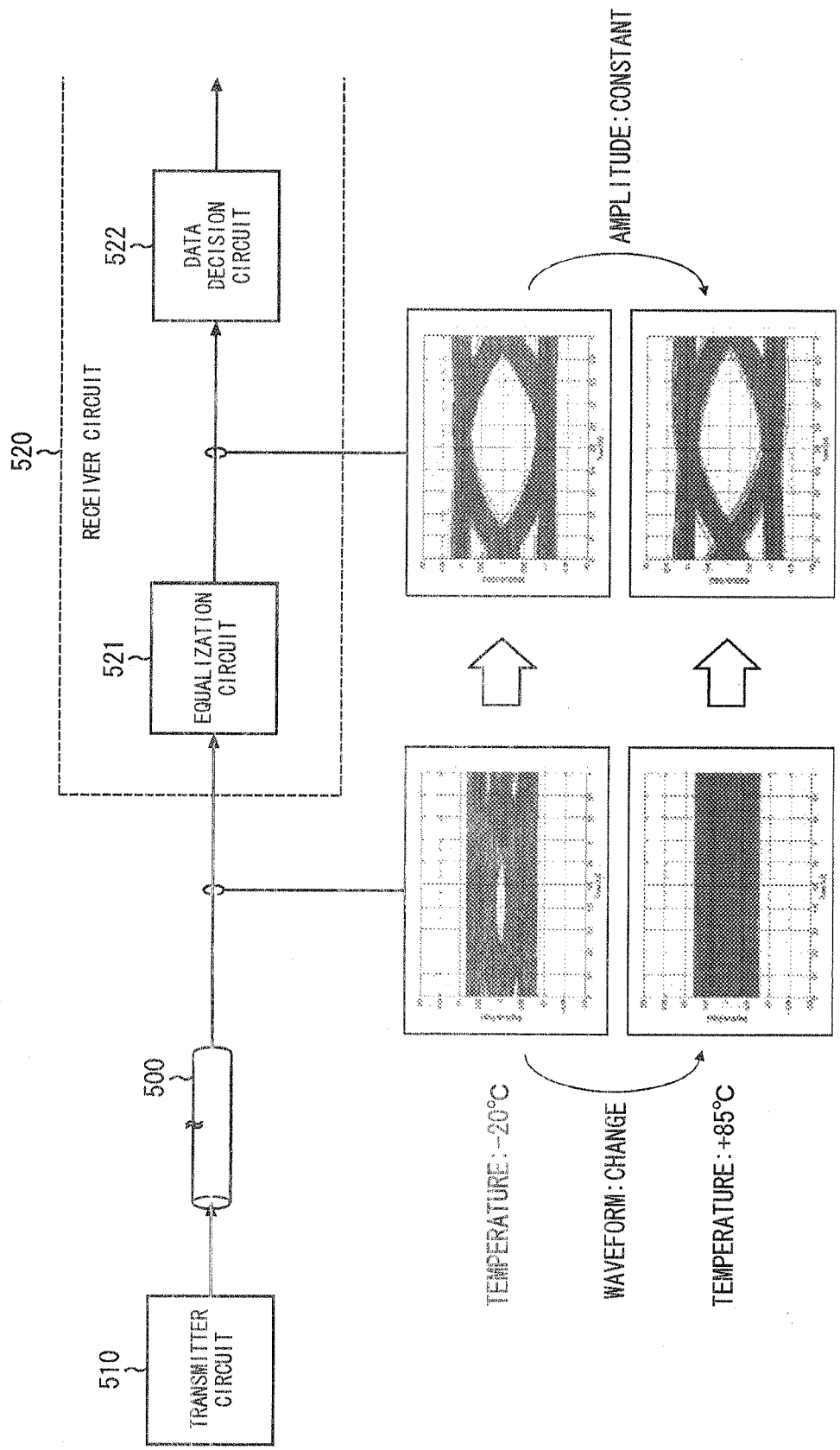
FIG. 12 is an explanatory diagram illustrating the concept of adaptive equalization.
Figure 13:
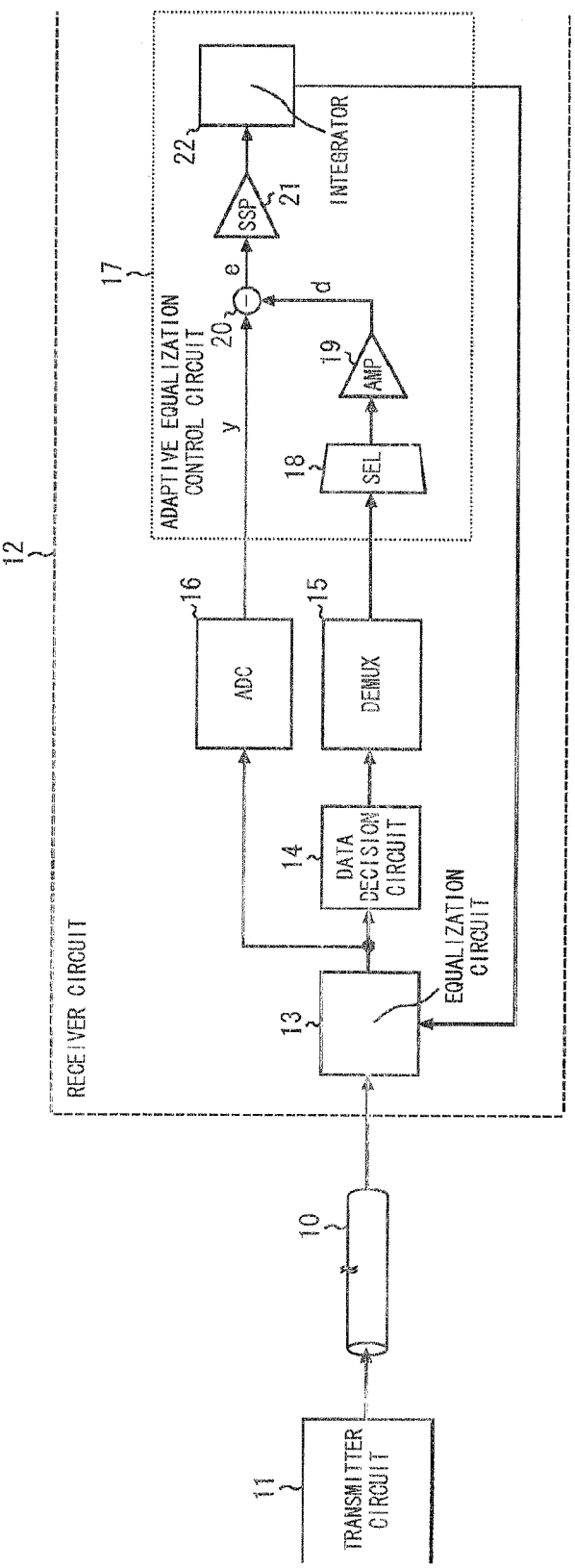
FIG. 13 is an explanatory diagram illustrating an example of a receiver circuit.
Figure 14:
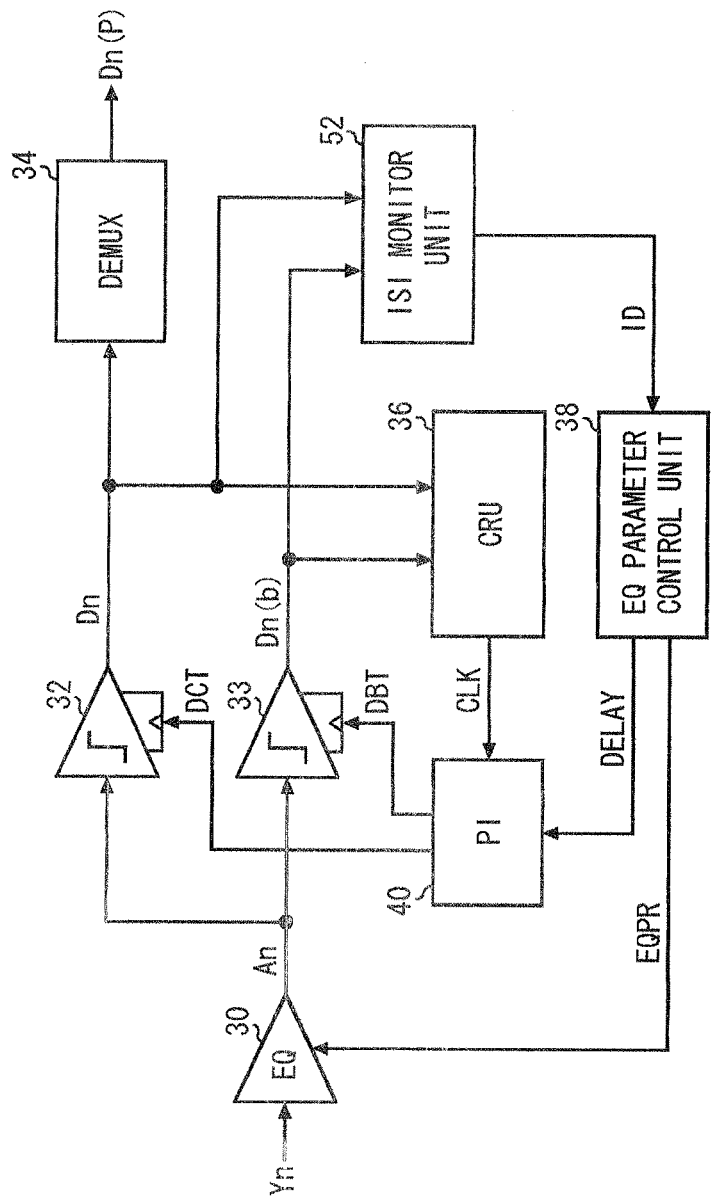
FIG. 14 is an explanatory diagram illustrating another example of a receiver circuit.

FIG. 10 illustrates a second embodiment. A receiver circuit 200 of the second embodiment includes an equalization circuit (EQ) 201, data decision circuits 202, 204, boundary decision circuits 203, 205, a demultiplexer (DEMUX) 206, selectors 207, 209, a clock recovery unit (CRU) 208, an adaptive equalization control circuit 210, and a clock generation circuit (PI) 211.

The equalization circuit 201 equalizes an input data signal IN with the equalization characteristic corresponding to the value of an equalization coefficient signal EQ_COEFF to generate an output signal INDT. The data decision circuit 202 makes a decision on the output signal INDT of the equalization circuit 201 in synchronization with a clock signal DCK0 to generate a received data signal RDT0. The boundary decision circuit 203 makes a decision on the output signal INDT of the equalization circuit 201 in synchronization with a clock signal BCK0 to generate a boundary data signal BDT0. The data decision circuit 204 makes a decision on the output signal INDT of the equalization circuit 201 in synchronization with a clock signal DCK1 to generate a received data signal RDT1. The boundary decision circuit 205 makes a decision on the output signal INDT of the equalization circuit 201 in synchronization with a clock signal BCK1 to generate a boundary data signal BDT1. The demultiplexer 206 serial-to-parallel converts the received data signals RDT0. RDT1 to generate an output data signal OUT.

The selector 207 selects and outputs the boundary data signal BDT0 when the value of a data selection signal DTS is "0", and selects and outputs the boundary data signal BDT1 when the value of the data selection signal DTS is "1". The clock recovery unit 208 detects the phase of the output signal INDT of the equalization circuit 201 based on the received data signals RDT0. RDT1 and the output signal of the selector 207 (one of the boundary data signals BDT0. BDT1 that is selected by the selector 207), and generates a phase adjustment amount signal PI_CODE according to the detection result.

The selector 209 selects and outputs the boundary data signal BDT1 when the value of the data selection signal DTS is "0", and selects and outputs the boundary data signal BDT0 when the value of the data selection signal DTS is "1". The adaptive equalization control circuit 210 predicts the data width of the output signal INDT of the equalization circuit 201 based on a logical comparison result between the received data signals RDT0, RDT1 and the output signal of the selector 209 (one of the boundary data signals BDT0, BDT1 that is selected by the selector 209) when the value of a phase adjustment amount offset signal PI_OFFSET_CODE is changed, and adjusts the value of an equalization coefficient signal EQ_COEFF so that the data width of the output signal INDT of the equalization circuit 201 becomes close to one-bit width. In addition, the equalization coefficient derivation method (circuit structure) of the adaptive equalization control circuit 210 is similar to the equalization coefficient derivation method (circuit structure) of the adaptive equalization control circuit 108 in the first embodiment. Further, the adaptive equalization control circuit 210 dynamically changes the value of the data selection signal DTS. A transition timing of the data selection signal DTS in the adaptive equalization control circuit 210 is adjustable. That is, a switching timing of a selection side and a non-selection side in the selectors 207, 209 is adjustable.

When the value of the data selection signal DTS is "0", the clock generation circuit 211 adjusts the phases of the clock signals DCK0, DCK1, BCK0 based on the value of the phase adjustment amount signal PI_CODE, and adjusts the phase of the clock signal BCK1 based on a result of adding the value of the phase adjustment amount signal PI_CODE and the value of the phase adjustment amount offset signal PI_OFFSET_CODE. Further, when the value of the data selection signal DTS is "1", the clock generation circuit 211 adjusts the phases of the clock signals DCK0, DCK1, BCK1 based on the value of the phase adjustment amount signal PI_CODE, and adjusts the phase of the clock signal BCK0 based on a result of adding the value of the phase adjustment amount signal PI_CODE and the value of the phase adjustment amount offset signal PI_OFFSET_CODE.

In the second embodiment as described above, assuming a receiver circuit having a half-rate structure, the boundary circuits 203, 205 and the clock generation circuit 211 are shared between the CDR function and the adaptive equalization function. Thus, the similar effects as those in the first embodiment can be obtained without increasing the circuit scale (without providing a boundary circuit and a clock generation circuit which are dedicated for the adaptive equalization function).

Aforementioned embodiments may be applied to a receiver circuit used for data communication between elements in an LSI or between circuit blocks in an LSI, data communication between LSIs, data communication between boards or between casings, or the like.

A proposition of any of the embodiments is to realize the adaptive equalization function with less affecting the CDR function in a receiver circuit.

According to a first aspect of the embodiment, a receiver circuit includes an equalization circuit, a data decision circuit, a first boundary decision circuit, a first phase adjustment circuit, a second boundary decision circuit, a second phase adjustment circuit, and an adaptive equalization control circuit. The equalization circuit equalizes an input signal. The data decision circuit makes a decision on an output signal of the equalization circuit in synchronization with a data decision clock signal. The first boundary decision circuit makes a decision on the output signal of the equalization circuit in synchronization with a first boundary decision clock signal. The first phase adjustment circuit adjusts phases of the data decision clock signal and the first boundary decision clock signal according to a phase adjustment amount based on an output signal of the data decision circuit and an output signal of the first boundary decision circuit. The second boundary decision circuit makes a decision on the output signal of the equalization circuit in synchronization with a second boundary decision clock signal. The second phase adjustment circuit adjusts a phase of the second boundary decision clock signal according to a result of adding the phase adjustment amount and a phase adjustment amount offset. The adaptive equalization control circuit adjusts an equalization coefficient of the equalization circuit according to a data width of the output signal of the equalization circuit based on a logical comparison result between the output signal of the data decision circuit and an output signal of the second boundary decision circuit when the phase adjustment amount offset is changed.

In such a first aspect, the first boundary decision circuit and the first phase adjustment circuit used for a CDR function and the second boundary decision circuit and the second phase adjustment circuit used for an adaptive equalization function are provided separately. Thus, the circuit structure for realizing the adaptive equalization function does not affect the CDR function. Therefore, the CDR function and the adaptive equalization function can both be established, and a receiver circuit with higher possibility of realization can be provided.

According to a second aspect of the embodiment, a receiver circuit includes an equalization circuit, a first data decision circuit, a second data decision circuit, a first boundary decision circuit, a second boundary decision circuit, a selection circuit, a phase adjustment circuit, and an adaptive equalization control circuit. The equalization circuit equalizes an input signal. The first data decision circuit makes a decision on an output signal of the equalization circuit in synchronization with a first data decision clock signal. The second data decision circuit makes a decision on the output signal of the equalization circuit in synchronization with a second data decision clock signal. The first boundary decision circuit makes a decision on the output signal of the equalization circuit in synchronization with a first boundary decision clock signal. The second boundary decision circuit makes a decision on the output signal of the equalization circuit in synchronization with a second boundary decision clock signal. The selection circuit dynamically switches between a selection side and a non-selection side with respect to the first and second boundary decision circuits. The phase adjustment circuit adjusts phases of the first and second data decision clock signals and the selection side of the first and second boundary decision clock signals according to a phase adjustment amount based on output signals of the first and second data decision circuits and the selection side of output signals of the first and second boundary decision circuits, and adjusts a phase of the non-selection side of the first and second boundary decision clock signals according to a result of adding the phase adjustment amount and a phase adjustment amount offset. The adaptive equalization control circuit adjusts an equalization coefficient of the equalization circuit according to a data width of the output signal of the equalization circuit based on a logical comparison result between the output signals of the first and second data decision circuits and the non-selection side of the output signals of the first and second boundary decision circuits when the phase adjustment amount offset is changed.

In such a second aspect, assuming a receiver circuit having a half-rate structure, the first and second boundary decision circuits and the phase adjustment circuit are shared between the CDR function and the adaptive equalization function. Thus, the similar effects as those in the first aspect can be obtained without increasing the circuit scale.

According to any of the aforementioned embodiments, an adaptive equalization function may be realized without affecting a CDR function in a receiver circuit, and a receiver circuit with higher possibility of realization may be provided.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be mage hereto without departing from the spirit and scope of the invention.

What is claimed is:
1. A receiver circuit, comprising:
an equalization circuit equalizing an input signal;
a first data decision circuit making a decision on an output signal of the equalization circuit in synchronization with a first data decision clock signal, and a second data decision circuit making a decision on the output signal of the equalization circuit in synchronization with a second data decision clock signal, the first data decision clock signal and the second data decision clock signal each having different phase and being able to adjust a phase independently of each other;

a first boundary decision circuit making a decision on the output signal of the equalization circuit based on a first boundary decision clock signal, and a second boundary decision circuit making a decision on the output signal of the equalization circuit based on a second boundary decision clock signal, the first boundary decision clock signal and the second boundary decision clock signal each having different phase and being able to adjust a phase independently of each other;

a selection circuit dynamically switching between a selection side and a non-selection side with respect to the first and second boundary decision circuits;

a phase adjustment circuit adjusting phases of the first and second data decision clock signals and the selection side of the first and second boundary decision clock signals according to a phase adjustment amount based on output signals of the first and second data decision circuits and the selection side of output signals of the first and second boundary decision circuits, and adjusting a phase of the non-selection side of the first and second boundary decision clock signals according to a result of adding the phase adjustment amount and a phase adjustment amount offset; and an adaptive equalization control circuit adjusting an equalization coefficient of the equalization circuit according to a data width of the output signal of the equalization circuit based on a logical comparison result between the output signals of the first and second data decision circuits and the non-selection side of the output signals of the first and second boundary decision circuits when the phase adjustment amount offset is changed.

2. The receiver circuit according to claim 1, wherein a timing of switching between the selection side and the non-selection side in the selection circuit is adjustable.

3. A receiver circuit, comprising:
an equalization circuit equalizing an input signal;
a first data decision circuit making a decision on an output signal of the equalization circuit in synchronization with a first data decision clock signal, and a second data decision circuit making a decision on the output signal of the equalization circuit in synchronization with a second data decision clock signal;

a first boundary decision circuit making a decision on the output signal of the equalization circuit based on a first boundary decision clock signal, and a second boundary decision circuit making a decision on the output signal of the equalization circuit based on a second boundary decision clock signal;

a selection circuit dynamically switching between a selection side and a non-selection side with respect to the first and second boundary decision circuits;

a phase adjustment circuit adjusting phases of the first and second data decision clock signals and the selection side of the first and second boundary decision clock signals according to a phase adjustment amount based on output signals of the first and second data decision circuits and the selection side of output signals of the first and second boundary decision circuits, and adjusting a phase of the non-selection side of the first and second boundary decision clock signals according to a result of adding the phase adjustment amount and a phase adjustment amount offset; and an adaptive equalization control circuit adjusting an equalization coefficient of the equalization circuit according to a data width of the output signal of the equalization circuit based on a logical comparison result between the output signals of the first and second data decision circuits and the non-selection side of the output signals of the first and second boundary decision circuits when the phase adjustment amount offset is changed, wherein the adaptive equalization control circuit performs, for every set value of the equalization coefficient, a logical comparison between the output signals of the first and second data decision circuits and the non-selection side of the output signals of the first and second boundary decision circuits a given number of times with respect to each of set values of the phase adjustment amount offset, and obtains an absolute value of a cumulative addition value of logical comparison results; and the adaptive equalization control circuit decides that a set value of the equalization coefficient which maximizes an integral value, obtained by integrating the absolute value of the cumulative addition value with respect to a set range of the phase adjustment amount offset, is an optimal value.

4. The receiver circuit according to claim 3, wherein a set range of the phase adjustment amount offset is adjustable.

5. The receiver circuit according to claim 3, wherein the given number of times is adjustable.

6. A receiver circuit, comprising:
an equalization circuit equalizing an input signal;
a first data decision circuit making a decision on an output signal of the equalization circuit in synchronization with a first data decision clock signal, and a second data decision circuit making a decision on the output signal of the equalization circuit in synchronization with a second data decision clock signal;

a first boundary decision circuit making a decision on the output signal of the equalization circuit based on a first boundary decision clock signal, and a second boundary decision circuit making a decision on the output signal of the equalization circuit based on a second boundary decision clock signal;

a selection circuit dynamically switching between a selection side and a non-selection side with respect to the first and second boundary decision circuits;

a phase adjustment circuit adjusting phases of the first and second data decision clock signals and the selection side of the first and second boundary decision clock signals according to a phase adjustment amount based on output signals of the first and second data decision circuits and the selection side of output signals of the first and second boundary decision circuits, and adjusting a phase of the non-selection side of the first and second boundary decision clock signals according to a result of adding the phase adjustment amount and a phase adjustment amount offset; and an adaptive equalization control circuit adjusting an equalization coefficient of the equalization circuit according to a data width of the output signal of the equalization circuit based on a logical comparison result between the output signals of the first and second data decision circuits and the non-selection side of the output signals of the first and second boundary decision circuits when the phase adjustment amount offset is changed, wherein the adaptive equalization control circuit performs, for every set value of the equalization coefficient, a logical comparison between the output signals of the first and second data decision circuits and the non-selection side of the output signals of the first and second boundary decision circuits a given number of times with respect to each of set values of the phase adjustment amount offset, and obtains an absolute value of a cumulative addition value of logical comparison results; and the adaptive equalization control circuit decides that a set value of the equalization coefficient which minimizes a range of the phase adjustment amount offset, in which the absolute value of the cumulative addition value does not match the given number of times, is an optimal value.

7. The receiver circuit according to claim 6, wherein a set range of the phase adjustment amount offset is adjustable.

8. The receiver circuit according to claim 6, wherein the given number of times is adjustable.

* * * * *